(12) United States Patent
Fargeix et al.

(10) Patent No.: US 12,423,233 B2
(45) Date of Patent: Sep. 23, 2025

(54) ORDER ENFORCEMENT FOR DELEGABLE MEMORY ACCESSES

(71) Applicant: Arm Limited, Cambridge (GB)

(72) Inventors: Yohan Fernand Fargeix, Nice (FR); Geoffray Matthieu Lacourba, Nice (FR); Albin Pierrick Tonnerre, Nice (FR); Paolo Monti, Quattordio (IT); Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 29 days.

(21) Appl. No.: 18/523,249

(22) Filed: Nov. 29, 2023

(65) Prior Publication Data

US 2025/0173265 A1 May 29, 2025

(51) Int. Cl.
*G06F 12/0804* (2016.01)
*G06F 12/0873* (2016.01)

(52) U.S. Cl.
CPC ...... *G06F 12/0804* (2013.01); *G06F 12/0873* (2013.01)

(58) Field of Classification Search
CPC .................. G06F 12/0804; G06F 12/0873
See application file for complete search history.

(56) References Cited

U.S. PATENT DOCUMENTS

| 11,507,506 B2 * | 11/2022 | Kipp | ................. G06F 12/0804 |
| 2018/0302468 A1 * | 10/2018 | Hu | ..................... G06F 16/9577 |

* cited by examiner

*Primary Examiner* — Aracelis Ruiz
(74) *Attorney, Agent, or Firm* — NIXON & VANDERNYE P.C.

(57) ABSTRACT

An apparatus is provided. Delegable memory accesses are offloaded to be performed by an external processing apparatus, whereas non-delegable memory accesses are performed locally. Nonetheless, an ordering requirement may still be enforced between them. The apparatus comprises tracking circuitry to maintain tracking information related to delegable memory accesses separately from tracking information related to non-delegable memory accesses. Order enforcement circuitry may enforce an ordering requirement between a non-delegable memory access and a delegable memory access based on a lookup of the tracking information.

20 Claims, 18 Drawing Sheets

78

| | LSRT | | | | | |
|---|---|---|---|---|---|---|
| | cnt0 | cnt1 | cnt2 | cnt3 | address of region | attributes |
| 1 | | | | | addr_1 | |
| 2 | | | | | addr_2 | |

FIG. 7A

ORDER ENFORCEMENT FOR DELEGABLE MEMORY ACCESSES

BACKGROUND

Technical Field

The present technique relates to the field of data processing, and in particular relates to managing accesses to a memory.

Technical Background

A data processing apparatus may be subject to ordering requirements while executing a computer program. In particular, an instruction set architecture may enforce such ordering requirements between accesses to memory so that any modifications to memory are performed consistently and as intended by a programmer.

SUMMARY

At least some examples of the present technique provide an apparatus comprising:
memory access circuitry configured to perform memory accesses in response to memory access instructions among a series of instructions to be executed; offloading circuitry configured to: identify, in the series of instructions, a delegable memory access instruction specifying a delegable memory access to be performed to a target address by an external processing apparatus instead of the delegable memory access being performed by the memory access circuitry; and dependent on the delegable memory access instruction being committed, to send a request to the external processing apparatus to request that the external processing apparatus performs the delegable memory access specified by the delegable memory access instruction; tracking circuitry to maintain tracking information representing the target address of the delegable memory access in a delegable memory access tracking structure separate from a tracking structure used to track non-delegable memory accesses to be performed by the memory access circuitry; and order enforcement circuitry configured to enforce an ordering requirement between a given non-delegable memory access and the delegable memory access based on a lookup of address information associated with the given non-delegable memory access in the delegable memory access tracking structure.

At least some examples of the present technique provide a system comprising: the apparatus described above, implemented in at least one packaged chip; at least one system component; and a board, wherein the at least one packaged chip and the at least one system component are assembled on the board.

At least some examples of the present technique provide a chip-containing product comprising the system described above, assembled on a further board with at least one other product component.

At least some examples of the present technique provide a method comprising: performing, with memory access circuitry, memory access instructions among a series of instructions to be executed; identifying, in the series of memory access instructions, a delegable memory access instruction specifying a delegable memory access to be performed to a target address by an external processing apparatus instead of the delegable memory access being performed by the memory access circuitry and, dependent on the delegable memory access instruction being committed, sending a request to the external processing apparatus to request that the external processing apparatus performs the delegable memory access specified by the delegable memory access instruction; maintaining tracking information representing the target address of the delegable memory access in a delegable memory access tracking structure separate from a tracking structure used to track non-delegable memory access to be performed by the memory access circuitry; and enforcing an ordering requirement between a given non-delegable memory access and the delegable memory access based on a lookup of address information associated with the given non-delegable memory access in the delegable memory access tracking structure.

At least some examples of the present technique provide a non-transitory computer-readable medium to store computer-readable code for fabrication of an apparatus comprising: memory access circuitry configured to perform memory accesses in response to memory access instructions among a series of instructions to be executed; offloading circuitry configured to: identify, in the series of instructions, a delegable memory access instruction specifying a delegable memory access to be performed to a target address by an external processing apparatus instead of the delegable memory access being performed by the memory access circuitry; and dependent on the delegable memory access instruction being committed, to send a request to the external processing apparatus to request that the external processing apparatus performs the delegable memory access specified by the delegable memory access instruction; tracking circuitry to maintain tracking information representing the target address of the delegable memory access in a delegable memory access tracking structure separate from a tracking structure used to track non-delegable memory accesses to be performed by the memory access circuitry; and order enforcement circuitry configured to enforce an ordering requirement between a given non-delegable memory access and the delegable memory access based on a lookup of address information associated with the given non-delegable memory access in the delegable memory access tracking structure.

Further aspects, features and advantages of the present technique will be apparent from the following description of examples, which is to be read in conjunction with the accompanying drawings.

BRIEF DESCRIPTION OF THE DRAWINGS

FIG. 7A illustrates an example of the content of a load-store region table;

DESCRIPTION OF EXAMPLES

Figure 1:
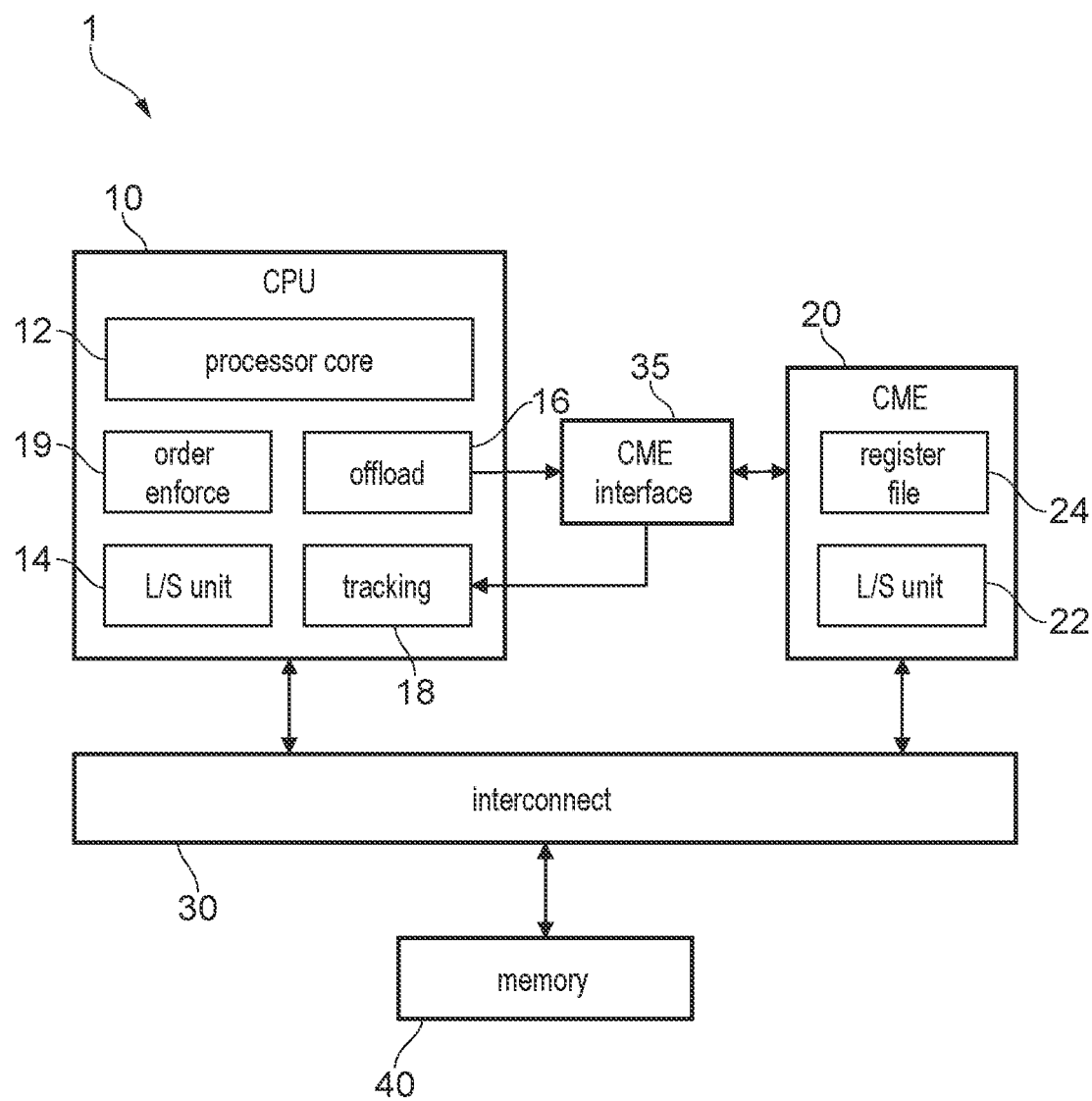
FIG. 1 illustrates a data processing system.

An apparatus comprises memory access circuitry to perform memory accesses in response to memory access instructions among a series of instructions to be executed, and offloading circuitry to identify, in the series of instructions, a memory access instruction specifying a memory access (i.e. a load or a store) that can be delegated for processing by an external processing apparatus. The external processing apparatus may comprise specialised hardware to perform some instructions more efficiently than the memory access circuitry that handles other non-delegated memory accesses, and/or can help improve performance by freeing up resource at the memory access circuitry for other operations. Therefore delegating those instructions to be performed by the external processing apparatus instead of by the memory access circuitry can improve the performance of a program. The external processing apparatus may be contained within a data processing system that also comprises the apparatus. Dependent on a delegable memory access being committed, the offloading circuitry sends a request to the external processing apparatus to perform the delegable memory access. This request may include information for identifying the memory access to be performed at the external processing apparatus, such as an indication of a memory address to be accessed by the external processing apparatus. A delegable memory access may be considered to be committed when it is known that performing the memory access is "correct" (which may depend on resolution of prior branch predictions, verification that no older instructions have signalled an exception, and/or verification that the operands used for calculating the address of the memory access are correct). Sending the request to the external processing apparatus in response to commitment of the delegable memory access has the advantage of permitting simpler implementations of the external processing apparatus as it means that the external processing apparatus does not need to support mechanisms for predicting program execution flow and dealing with synchronous exceptions. On the other hand, memory access instructions that are not identified as delegable memory access instructions by the offloading circuitry may be identified as non-delegable memory access instructions. Non-delegable memory access instructions are not delegated to the external processing apparatus, and are instead performed by memory access circuitry that is local to the apparatus.

Where there is a series of memory access instructions being executed, it may be possible for instructions to be performed out-of-order. It is recognised that some memory access instructions may have an ordering requirement that should be enforced in order for the program to be performed correctly. In particular, a non-delegable memory access may have an ordering requirement in relation to a preceding delegable memory access such that they are to be performed in a specific order. In some circumstances, the delegable memory accesses and non-delegable memory accesses may need to be subject to the same ordering requirements as they would have been if they had all been performed on the memory access circuitry, but this can be more complex to enforce in a scenario where the delegable memory accesses have been (or are expected to be) offloaded to the external processing apparatus and the request to offload the delegable memory access is not sent to the external processing apparatus until the delegable memory access has been committed.

One approach to enforcing an ordering requirement in this scenario is to track delegable and non-delegable memory accesses in a common tracking structure to identify and enforce ordering requirements between them. A problem with this approach is that while delegable memory accesses are waiting to be committed and/or completed, the corresponding entries in the common tracking structure will be taking up the available space, thereby reducing the effective size of the common tracking structure for tracking non-delegable memory accesses. This problem is exacerbated if the external processing apparatus does not support execution of not-yet-committed instructions. Given the potential delays in offloading and performing the delegable memory accesses, delegable memory accesses may remain uncompleted for a long time, and so if they are tracked in the same structures as non-delegable memory accesses, the number of non-delegable memory accesses that can be tracked can be significantly reduced. When the effective size of the tracking structure is reduced, there is a possibility that younger non-delegable memory accesses cannot be tracked and so are stalled, therefore constraining the performance of those non-delegable memory accesses by the local memory access circuitry, and hence performance for the stream of instructions as a whole.

According to the present technique, the apparatus comprises tracking circuitry to maintain tracking information representing the target addresses of delegable memory accesses in a delegable memory access tracking structure, for example a table. The delegable memory access tracking structure is maintained separately from a tracking structure used for non-delegable memory accesses. Therefore, while un-committed or uncompleted delegable memory accesses are awaiting commitment or completion respectively, they are not stalled in the tracking structure used for non-delegable memory accesses, preserving the effective size of that tracking structure. Tracking information can be generated and stored in the delegable memory access tracking structure upon identification of a delegable memory access by the offloading circuitry. The tracking information may be representative of a target address by, for example, storing the address, a portion of the address or a reference to further tracking information stored elsewhere.

Order enforcement circuitry is provided to enforce an ordering requirement based on a lookup of address information associated with a given non-delegable memory access in the delegable memory access tracking structure. The lookup allows for a determination of whether there is a risk that allowing the given non-delegable memory access to be performed before completion of a preceding delegable memory access could violate the ordering requirement. Accordingly, the order enforcement circuitry can effectively enforce an ordering requirement between non-delegable memory accesses and delegable memory accesses. This is especially effective where the delegable memory accesses are sent to an external processing apparatus in program order dependent on the delegable memory accesses having committed.

In some examples, the order enforcement circuitry is configured to detect an ordering hazard between the given non-delegable memory access and the delegable memory access in response to detecting that: the tracking information representing the target address of the delegable memory access corresponds to the address information associated with the given non-delegable memory access, and the given non-delegable memory access is associated with an instruction that is later in program order than the delegable memory access instruction.

Such ordering hazards may include data hazards such as read-after-write, write-after-read and write-after-write, where the program order of memory accesses specifying the same address is important for the program to be performed correctly. Accordingly, the order enforcement circuitry may detect these hazards based on the tracking information to enforce an ordering requirement of performing such memory accesses in order. The tracking information representing the target address can be compared with address information associated with the given non-delegable memory access to determine whether there is a risk that the memory accesses are directed to the same address. If so, then there is a risk of a data hazard and the order enforcement circuitry can enforce the ordering requirement accordingly.

In some examples, in response to detecting, based on the lookup of the address information, an ordering hazard between the given non-delegable memory access and the delegable memory access, the order enforcement circuitry is configured to prevent the memory access circuitry from performing the given non-delegable memory access. In the event that an ordering hazard is detected, the ordering requirement is enforced to prevent the memory access circuitry from performing the given non-delegable memory access. The order enforcement circuitry may prevent the memory access circuitry for example by flushing the memory access and re-fetching the memory access instruction, or by stalling the memory access in a load/store queue. Accordingly, the order enforcement circuitry prevents the memory accesses from being performed in the incorrect order.

In some examples, the order enforcement circuitry is configured to stop preventing the memory access circuitry from performing the given non-delegable memory access in response to a completion notification indicating that the external processing apparatus has completed the delegable memory access. In such examples, having identified a hazard, the order enforcement circuitry waits for the external processing apparatus to complete the delegable memory access, before enabling the given non-delegable memory access to be processed. Then it can be known that the given non-delegable memory access will be performed in the correct order relative to the delegable memory access and if dependent on the delegable memory access can use a value obtained by the delegable memory access as an operand for the given non-delegable memory access.

In some examples, in response to detecting, based on the lookup of the address information, no ordering hazard between the given non-delegable memory access and the delegable memory access, the order enforcement circuitry is configured to permit the memory access circuitry to perform the given non-delegable memory access (e.g. without waiting for completion of the delegable memory access). In the event that no ordering hazard is detected, the order enforcement circuitry can permit the memory access circuitry to perform the given non-delegable memory access out-of-order relative to the delegable memory access. Accordingly, performance is improved by allowing the given non-delegable memory access to be performed sooner than it otherwise would have, and hence subsequent instructions dependent on the given non-delegable memory access can also be executed sooner.

In some examples, in absence of detection of an ordering hazard between the given non-delegable memory access and the delegable memory access, the memory access circuitry is configured to speculatively execute the given non-delegable memory access before the delegable memory access is committed. Where no ordering hazard is detected, it is possible to speculatively execute the given non-delegable memory access before the delegable memory access is committed. The execution is speculative in that if an error is detected due to incorrect speculation (e.g. a branch misprediction), the architectural state of the apparatus can be 'rolled back' to the state immediately before speculation.

In some examples, the ordering requirement is based on at least a program order of the given non-delegable memory access and the delegable memory access.

In some examples, the tracking circuitry is configured to maintain a plurality of entries of the delegable memory access tracking structure, such that the plurality of entries are representative of a program order of a plurality of delegable memory accesses including the delegable memory access. The program order may be useful in determining how to enforce the ordering requirement for a given non-delegable memory access. In some examples, the program order is implicitly represented, such as by storing the delegable memory accesses in program order (e.g. by providing a circular buffer where entries of the buffer are allocated in program order for a given set of delegable memory accesses). Alternatively, in other examples, the program order is explicitly represented with an ordering identifier stored in association with each entry in the delegable memory access tracking structure.

In some examples, the tracking information can comprise an indication of the target address itself.

However, in some examples, the tracking information comprises a memory region identifier indicative of a region of memory addresses including the target address. In such examples, the tracking circuitry only needs to maintain a relatively small amount of data as compared to tracking the entire target address of the delegable memory access. For example, the memory region identifier may be a predefined number of higher-order bits of the addresses in that region, or an ID value assigned to predefined memory regions. Such regions may be of a predefined and uniform granularity, or there may be variably sized regions throughout the memory address space. It will be appreciated that, in these examples, the 'resolution' of the tracking information is dependent on the size of the memory regions. In particular, there is a risk that an ordering hazard could be detected if a non-delegable and delegable memory access targeted the same region, but in fact did not target the same or overlapping addresses. It will be appreciated that larger memory regions, while requiring less data to track, may cause more 'false positive' detections of ordering hazards since there is a higher probability that two addresses can belong to the same region without actually overlapping. Therefore some implementations may use smaller memory regions to achieve greater accuracy in detecting ordering hazards in exchange for a need for more tracking information.

In some examples, the tracking circuitry is configured to maintain a region table to store at least a portion of a physical region address defining the region of memory addresses; and the memory region identifier comprises an index at which the portion of the physical region address is stored in the region table. In such examples, the tracking information is a small amount of data. The index identifying a particular entry of the region table may have fewer bits than the corresponding physical region address. Accordingly, each entry of the delegable memory access tracking structure holds less data, and so the delegable memory access tracking structure can be reduced.

In some examples, the tracking circuitry is configured to maintain the region table to store at least one counter indicative of a number of uncompleted delegable memory accesses to the region of memory addresses that have been requested by the offloading circuitry but not yet indicated as completed by the external processing apparatus. In such examples, the tracking circuitry also tracks the delegable memory accesses that are being performed by the external processing apparatus. If there are no outstanding memory accesses to a particular region of memory, then it is recognised that it is not necessary to maintain a corresponding entry in the region table. Accordingly, the region table can be maintained more efficiently by re-allocating unused entries in the region table to define memory regions that are to be targeted by future memory accesses.

In some examples, the tracking circuitry is configured to maintain the region table to store a plurality of sub-region counters each indicative of a number of uncompleted delegable memory accesses to a corresponding sub-region of memory addresses within the region of memory addresses. In such examples, the region table is capable of tracking the delegable memory accesses at a finer granularity by associating a counter with each sub-region of the region of memory. In this way, even when there is an entry corresponding to the address information of a given non-delegable memory access, an ordering requirement can be enforced based on the value of a sub-region counter associated with that entry. In particular, if the sub-region counter corresponding to the address information associated with the given non-delegable memory access is zero, then there are no uncompleted delegable memory accesses corresponding to the non-delegable memory access, even if other sub-region counters in the same region table entry are non-zero. The order enforcement circuitry can then enforce the ordering requirement in the same way as though that entry was not there. Accordingly, the order enforcement circuitry can enforce the order requirement based on the sub-region counters, allowing for more accurate detections of ordering hazards.

In some examples, the tracking circuitry is configured to perform a synchronisation between the region table and a corresponding region table in the external processing apparatus. In such examples, the external processing apparatus may refer to a region table when performing the delegable memory accesses. This allows for the apparatus and the external apparatus to repeatedly indicate the same region of addresses to each other by indicating the memory region identifier by reference to the region table. If there are multiple accesses to the same region, the full address of the region only needs to be shared once in the synchronisation operation, and each request sent by the offloading circuitry can specify a smaller region table index and sub-region offset bits, which may be fewer bits than the full region address. By reducing the frequency with which the larger region address needs to be sent to the external processing apparatus, power can be saved.

In some examples, the offloading circuitry is configured to include, in the request to the external processing apparatus, the memory region identifier instead of the target address. In such examples, the memory region identifier is a relatively small amount of data, allowing for smaller data lines being required for the request between the apparatus and the external processing apparatus.

In some examples, the offloading circuitry is configured to identify an instruction of at least one class of single-instruction-multiple-data (SIMD) memory access instruction as the delegable memory access instruction. In such examples, it is recognised that SIMD memory access instructions often require similar operations being performed repeatedly, in parallel or both. Therefore, SIMD instructions can benefit from being performed on specialised hardware that is specifically designed to efficiently process SIMD instructions (e.g. hardware supporting wider SIMD registers). Additionally, SIMD operations typically have relatively little interaction with scalar operations (e.g. generating operands for future operations or using operands from previous operations). Accordingly, SIMD memory access instructions can be performed more efficiently by offloading them to an external processing apparatus, so that local execution circuitry can continue performing other instructions of the program that are less likely to be dependent on the SIMD operations until a block of SIMD processing is complete.

In some examples, the offloading circuitry is configured to identify, as the delegable memory access instruction, an instruction of said at least one class of SIMD memory access instruction which is executed in a predetermined mode of processing. In such examples, it is possible for the at least one class of SIMD instruction to be variably identified as delegable or non-delegable on a basis of whether the apparatus is in the predetermined mode. For example, when the apparatus is in the predetermined mode of processing, the at least one class is identified as a delegable memory access. Whereas when the apparatus is not in the predetermined mode of processing, the at least one class is identified as a non-delegable memory access. Even among SIMD operations, there may be some times of SIMD processing which are more standalone and can benefit from more specialised hardware, and other types which may be interspersed with other non-SIMD operations and can more efficiently be performed on local more general hardware, and so it is useful to support different modes which are associated with processing of the at least one class of SIMD memory access instructions on the local memory access circuitry or the external processing apparatus respectively.

In some examples, the SIMD instruction is a scalable vector/matrix instruction, wherein in response to the scalable vector/matrix instruction, the external processing apparatus is caused to perform a sequence of one or more operations on each element in a vector/matrix; and a size of the vector/matrix is defined by at least one parameter stored in a register. A scalable vector/matrix instruction allows for vectors/matrices defined in a program to be processed across a range of processing hardware. In particular, the parameter stored in a register can be set on a basis of the hardware-implemented registers in a given processor. Based on this parameter, the processor can determine how much of a given vector/matrix to be processed in a given instance. It will be appreciated that, where the parameter defines narrower hardware-implemented registers, the vector/matrix may require additional iterations to complete the SIMD operation. Nonetheless, from the point of view of the programmer, the program can be run effectively on different varieties of processor from small energy-efficient chips to large high-power/speed CPUs.

In some examples, the tracking circuitry is configured to allocate tracking information representing target addresses of one or more still-to-be-committed delegable memory accesses to the delegable memory access tracking structure. The delegable memory access tracking structure might also store information representing target addresses of one or more committed delegable memory accesses (e.g. delegable memory accesses which were still-to-be-committed at the time when the corresponding tracking information was allocated to the delegable memory access tracking structure, but which have since committed). However, by enabling tracking information relating to still-to-be-committed delegable memory accesses to be allocated to the delegable memory access tracking structure, which therefore do not need tracking in the regular tracking structures used for non-delegable memory accesses during the period before they are committed, this can free up resources in the regular tracking structures for non-delegable accesses, improving performance.

In absence of at least one intervening non-delegable store memory access between the delegable memory access and the given non-delegable memory access removing a need for hazarding between the delegable memory access and the given non-delegable memory access, the order enforcement circuitry may detect an ordering hazard between the given non-delegable memory access and the delegable memory access in response to detecting at least that: (i) the address information associated with the given non-delegable memory access corresponds to tracking information tracked in the delegable memory access tracking structure for the delegable memory access; and (ii) the given non-delegable memory access is associated with an instruction that is later in program order than the delegable memory access instruction. If there is at least one intervening non-delegable store (younger than the delegable memory access and older than the given non-delegable memory access) which removes the hazard between the delegable memory access and the given non-delegable memory access (e.g. because the intervening store(s) write to all bytes targeted by the given non-delegable memory access), then no hazard needs to be detected between the delegable memory access and the given non-delegable memory access even if conditions (i) and (ii) are satisfied. For example, if one or more such intervening stores occur, store-to-load forwarding could be used to forward the store data from the intervening store(s) to the given non-delegable (load) memory access, so that there is no need for hazard checking of that load against the delegable memory access older than the intervening stores (since any hazard checks performed between the given non-delegable memory access and the intervening non-delegable stores will be sufficient to ensure correct ordering).

In some examples, in addition to conditions (i) and (ii) there could also be further conditions required to be satisfied in order to detect an ordering hazard between the given non-delegable memory access and the delegable memory access, e.g. based on whether the non-delegable memory access and delegable memory access are load operations or store operations. For example, a non-delegable load might only hazard against delegable stores but not delegable loads (as normally reordering reads does not change the result if there are no intervening writes to the same address between the reads).

The apparatus may have a delegable instruction queue to track delegable instructions awaiting processing by the external processing apparatus, wherein each entry in the delegable instruction queue has a field for specifying an identifier of an associated entry in the delegable memory access tracking structure. Hence, the delegable instruction queue does not need to identify the target address of each delegable memory access tracked in the queue, as it can instead reference a corresponding entry of the delegable memory access tracking structure which comprises tracking information representing the target address. This approach can be more efficient for reducing circuit area and power consumption, because when multiple memory accesses are encountered corresponding to a same entry of the delegable memory access tracking structure (which can be quite common given address locality properties of most workloads), this approach can allow a larger number of bits stored as address tracking information in the delegable memory access tracking structure to be represented in more compact form in multiple entries of the delegable instruction queue by storing an identifier of the corresponding entry in the delegable memory access tracking structure (that identifier having fewer bits than the tracking information stored in the delegable memory access tracking structure to represent the address).

While the delegable instruction queue may have a field for specifying an identifier of an associated entry in the delegable memory access tracking structure, that field can also be used for other purposes for some instructions which do not have an associated entry in the delegable memory access tracking structure. For example, for delegable computation instructions which do not require any memory access at all, the delegable memory access tracking structure is not relevant and so the field can be reused for other purposes. As noted below, in some examples, the identifier of an associated entry in the delegable memory access tracking structure may, once the delegable memory access is guaranteed to be committed, be swapped for a region table identifier, so even for delegable memory accesses the field can be used for different purposes. Nevertheless, at least in the period when a delegable memory access is still not guaranteed to be committed, it can be useful to provide a field which references an identifier of a corresponding entry in the delegable memory access tracking structure to allow for ordering enforcement and reduce tracking storage requirements compared to explicitly indicating each address in the delegable instruction queue itself.

In some examples, the order enforcement circuitry is configured to detect whether the address information associated with the given non-delegable memory access corresponds to an address tracked in the delegable memory access tracking structure for the delegable memory access, based on detecting:
whether the delegable memory access tracking structure includes a conflicting entry for which the tracking information corresponds to the address information of the given non-delegable memory access; and
whether the delegable instruction queue includes a valid entry, relating to an older instruction than the instruction associated with the given non-delegable memory access, for which said field specifies the identifier of said conflicting entry of the delegable memory access tracking structure.

There can also be other conditions applied to detecting the hazard, such as whether or not the delegable instruction queue entry that specifies the identifier of the conflicting entry is a load memory access or store memory access, and/or whether hazard checks for the access tracked in the conflicting entry have themselves completed yet. However, in general, checking whether the delegable memory access tracking structure is a conflicting entry and checking whether the delegable instruction queue includes a valid entry referencing that conflicting entry can reduce the amount of comparison overhead compared to an approach which would store address information directly in the delegable instruction queue, for which hazarding comparisons would need to compare the address in each individual delegable instruction queue entry with the address of the given non-delegable memory access (typically requiring more bits to be compared than the approach using identifiers of entries in the delegable memory access tracking structure).

Although the hazard detection by the order enforcement circuitry is dependent on whether the delegable instruction queue includes a valid entry referencing a given conflicting entry of the delegable memory access tracking structure, some parts of this detection can be computed in advance of actually performing the hazard check for the given non-delegable memory access. In some examples, at least one vector may be computed indicating which entries of the delegable memory access tracking structure are referenced by valid entries of the delegable instruction queue. More particularly, such a vector may be computed separately for delegable loads and delegable stores. Also, such vectors may be dependent on whether the instruction in the valid entry of the delegable instruction queue has already passed any hazard checks against non-delegable memory accesses. By computing in advance at least one vector indicating which entries of the delegable memory access tracking structure are referenced by valid delegable instruction queue entries relating to load or store operations that have passed their hazard checks, this simplifies the detection at the time of hazarding a given non-delegable memory access, which can look up the delegable memory access tracking structure to find a conflicting entry having tracking information corresponding to the address information of the given non-delegable memory access, and qualify that lookup based on the at least one vector to exclude a hit in the delegable instruction queue which corresponds to an entry of the delegable memory access tracking structure not referenced by a valid delegable instruction queue entry corresponding to a load or store which has passed its hazard checks.

In some examples, the tracking circuitry may maintain a region table comprising a plurality of region table entries, each region table entry indicating a region mapping specifying a physical address region associated with a region table entry identifier identifying that region table entry; and the tracking circuitry may synchronise region mappings specified in the region table with a corresponding region table in the external processing apparatus. The offloading circuitry may include, in the request to the external processing apparatus, a selected region table entry identifier indicating which region table entry corresponds to a physical address region comprising the target address of the delegable memory access, instead of including a full target address of the delegable memory access. Also, the selected region table entry identifier can also eliminate a need to explicitly indicate memory region attributes in the request to the external processing apparatus, as such memory region attributes can also be specified in the region table and referenced indirectly using the region table entry identifier. Hence, by tracking addresses in a region table on a region-by-region basis and communicating a region table identifier to the external processing apparatus, this can reduce the amount of data that needs to be transferred to the external processing apparatus with each request, reducing the circuit area and power overhead of the interface to the external processing apparatus.

As well as providing the selected region table identifier in the region table entry, the request to the external processing apparatus may also specify offset bits identifying an offset of a target address of the corresponding delegable memory access relative to a region address of the physical address region corresponding to the selected region table identifier. The offset bits are bits of the target address that distinguish different addresses within the same region.

In some examples, the region table may track region mappings for physical address regions accessed by delegable memory access instructions guaranteed to be committed (e.g. an access instruction may be considered guaranteed to be committed if has either already committed or it has been determined that it is not possible for that access instruction to be flushed, e.g. due to detection of incorrect speculation (e.g. a branch misprediction) or a synchronous exception (e.g. address fault) occurring for an older instruction.

Hence, where a delegable memory access is to access a new physical address region not previously tracked in the region table, allocation of a new region table entry for that physical address region may depend on the corresponding delegable memory access that accesses that new region for the first time being guaranteed to be committed. Deferring region table updates until the corresponding accesses are guaranteed to be committed simplifies synchronisation of the region table with the corresponding region table in the external processing apparatus. The tracking circuitry may defer synchronising a given region mapping with the corresponding region table in the external processing apparatus until after a delegable memory access instruction which accesses a target address in a given physical address region specified by the given region mapping is guaranteed to be committed. As it is not necessary to perform any speculative synchronisations with the external copy of the region table which are not guaranteed to be committed, the communication bandwidth on the interface to the external processing apparatus can be preserved for communications which are guaranteed to be required. This also means that, to handle a given rate of memory accesses, the size of the region table can be smaller (on both sides of the interface) as there is no need to have extra entries to accommodate speculative regions that may not actually be accessed if their corresponding accesses are flushed before commitment. Hence, this approach can reduce the circuit area and power overheads of the tracking structures (especially on the external processing apparatus side) and interface with the external processing apparatus.

While in general synchronisation of a given region mapping with the corresponding region table in the external processing apparatus may be deferred until after a delegable memory access instruction which accesses a target address in a given physical address region specified by the given region mapping is guaranteed to be committed, in some examples an even stricter condition for synchronisation may be imposed. For example, synchronisations may be done in strict age order, so that it is not possible for a synchronisation update triggered by a younger delegable memory access to be performed before a synchronisation update triggered by an older delegable memory access. Hence, some implementations may perform synchronisations with the corresponding region table in the external processing apparatus in age order (program order).

In some examples, the delegable memory access tracking structure comprises a speculative region table, and the tracking circuitry may allocate region mappings to the speculative region table for physical address regions accessed by delegable memory access instructions not yet guaranteed to be committed. Hence, the delegable memory access tracking structure may be seen as a speculative version of the main region table used to track the physical address regions accessed by guaranteed to be committed delegable memory accesses. As mentioned above, although a given region mapping may be allocated to the speculative region table prior to the corresponding delegable memory access being guaranteed to be committed, a given region mapping in the speculative region table may also continue to be held in the speculative region table for some time after the corresponding delegable memory access is guaranteed to commit, when it is swapped into the (main non-speculative) region table.

Dependent on a delegable memory access instruction being guaranteed to be committed (optionally it could also be dependent on other conditions, such as hazard checks having passed), the tracking circuitry may update a region table entry of the region table corresponding to a target address of the delegable memory access instruction guaranteed to be committed, and perform a region table entry identifier swap process to replace a speculative region table entry identifier associated with the delegable memory access instruction with a region table entry identifier associated with the delegable memory access instruction. For example, the speculative region table entry identifier included in the field of the entry in the delegable instruction queue corresponding to the guaranteed-to-be-committed delegable memory access instruction could be replaced in that field with the region table entry of the region table entry corresponding to that instruction. Hence, continued tracking of the instruction can from then on be made using the region table entry rather than the speculative region table entry identifier. Providing the separate speculative and non-speculative versions of the region table is helpful to reduce overhead at the external processing apparatus by not needing to synchronise speculative updates to the region table with the external processing apparatus. To reduce storage requirements for the delegable instruction queue, the same field of a delegable instruction queue entry can be used for identifying both types of region table entry (an entry in the speculative region table entry prior to the corresponding entry being guaranteed to commit, and an entry in the region table afterwards).

In some cases, the update to the region table entry corresponding to the target address of the delegable memory access instruction guaranteed to be committed could be updating of an existing entry, e.g. to increment an access counter tracking the number of outstanding memory accesses to the corresponding physical address region. The update to the region table entry could also comprise allocating a new entry for the physical address region to be accessed by the delegable memory access instruction guaranteed to be committed, if there is no existing entry already allocated for that physical address region.

In the example above, the region table tracks only committed region mappings. However, in other examples, a region table may be provided which may track region mappings for physical address regions accessed by still-to-be-committed delegable memory access instructions, and the tracking circuitry is capable of speculatively synchronising a given region mapping with the corresponding region table in the external processing apparatus before a delegable memory access instruction which accesses a target address in a given physical address region specified by the given region mapping is guaranteed to be committed. Although this can increase overhead on the interface to the external processing apparatus as there would be additional traffic relating to synchronisations for physical address regions that might turn out not to be accessed due to a speculative still-to-be-committed delegable memory access instruction being flushed, this approach can reduce the overhead of the address representations in the delegable memory access tracking structure, which may, as the memory region identifier, store an index at which the portion of the physical region address is stored in the region table. Hence, in some examples as mentioned earlier, the tracking information may comprise a memory region identifier. The tracking circuitry may maintain a region table to store at least a portion of a physical region address defining the region of memory addresses; and the memory region identifier may comprise an index at which the portion of the physical region address is stored in the region table.

Regardless of whether or not the region table is used to track speculative region mappings for still-to-be-committed delegable memory access instructions (as in a first example described below with respect to FIGS. 5 and 6) or is restricted to tracking regions accessed by guaranteed-to-be-committed delegable memory access instructions (as in a second example described below with respect to FIG. 8), the tracking circuitry may maintain the region table to store at least one counter indicative of a number of uncompleted delegable memory accesses to the physical address region which are guaranteed to be committed but not yet indicated as completed by the external processing apparatus. This can be helpful for determining when a region table entry can be replaced with a new entry for a different region, once there are no longer any outstanding accesses to the old region that have not completed.

In some examples, the access counting may be implemented on a sub-region basis, where a single entry of the region table may store a plurality of sub-region counters each indicative of a number of said uncompleted delegable memory accesses to a corresponding sub-region of memory addresses within the physical address region. This allows finer granularity of tracking of outstanding delegable memory accesses, which can be helpful for improving the precision of hazard checks between delegable and non-delegable accesses, as tracking outstanding accesses on a sub-region basis can reduce the likelihood of a spurious detection of a hazard between a younger non-delegable load/store to a first sub-region of the physical address region tracked by a given region table entry and an older delegable load/store to a different second sub-region of the physical address region tracked by the given region table entry.

Specific examples will now be described with reference to the drawings.

FIG. 1 schematically illustrates a data processing system 1 comprising two data processing apparatuses: a central processing unit (CPU) 10 and a complex matrix extension unit (CME unit) 20, with an interconnect 30 connecting the data processing apparatuses to a main memory 40. The CPU 10 and CME unit 20 are configured to communicate via a CME interface 35. It will be appreciated that the data processing apparatuses shown in FIG. 1 are just examples, and the system 1 can include other type of processing apparatus (e.g. graphics processing unit or neural processing unit, etc.) instead of or in addition to the CPU 10. The system may also include additional CPUs other than the CPU 10.

The CPU 10 comprises a processor core 12, which comprises a data processing pipeline (including stages such as fetch, decode, rename, execute, etc.) for executing data processing instructions, data registers and one or more caches. It will be appreciated that many other configurations of the core 12 could also be provided depending on the particular workloads expected to be performed by the CPU 10. CPU 10 also comprises a load/store unit 14 (memory access circuitry) to issue memory access requests to memory 40 in response to memory access instructions executed by the core 12. Offloading circuitry 16 monitors a stream of memory access instructions being executed by the core 12 to identify delegable memory access instructions and non-delegable memory access instructions. At least the delegable memory accesses are then tracked by tracking circuitry 18, the details of which will be described later. Order enforcement circuitry 19 is provided to enforce an ordering requirement between various instructions executed by the processor core, based on lookup of tracking information maintained by the tracking circuitry 18. For example, those instructions may be executed out-of-order and could be susceptible to various types of ordering hazards. The order enforcement circuitry 19 enforces any ordering requirements to prevent a program from being executed incorrectly due to an ordering hazard. The interaction between the order enforcement circuitry 19 and the tracking circuitry 18 will be described in more detail later.

The CME unit 20 comprises a load/store unit 22 and a register file 24 for storing operands used by the load/store unit 22. In this example, the CME unit 20 may not include the resources necessary for complex program flow control such as prediction of program flow or dealing with synchronous exceptions such as address faults caused by load/store operations. Instead, the CMU unit 20 is configured to perform the delegable memory accesses which are dispatched to the CMU unit 20 in program order.

Figure 2:
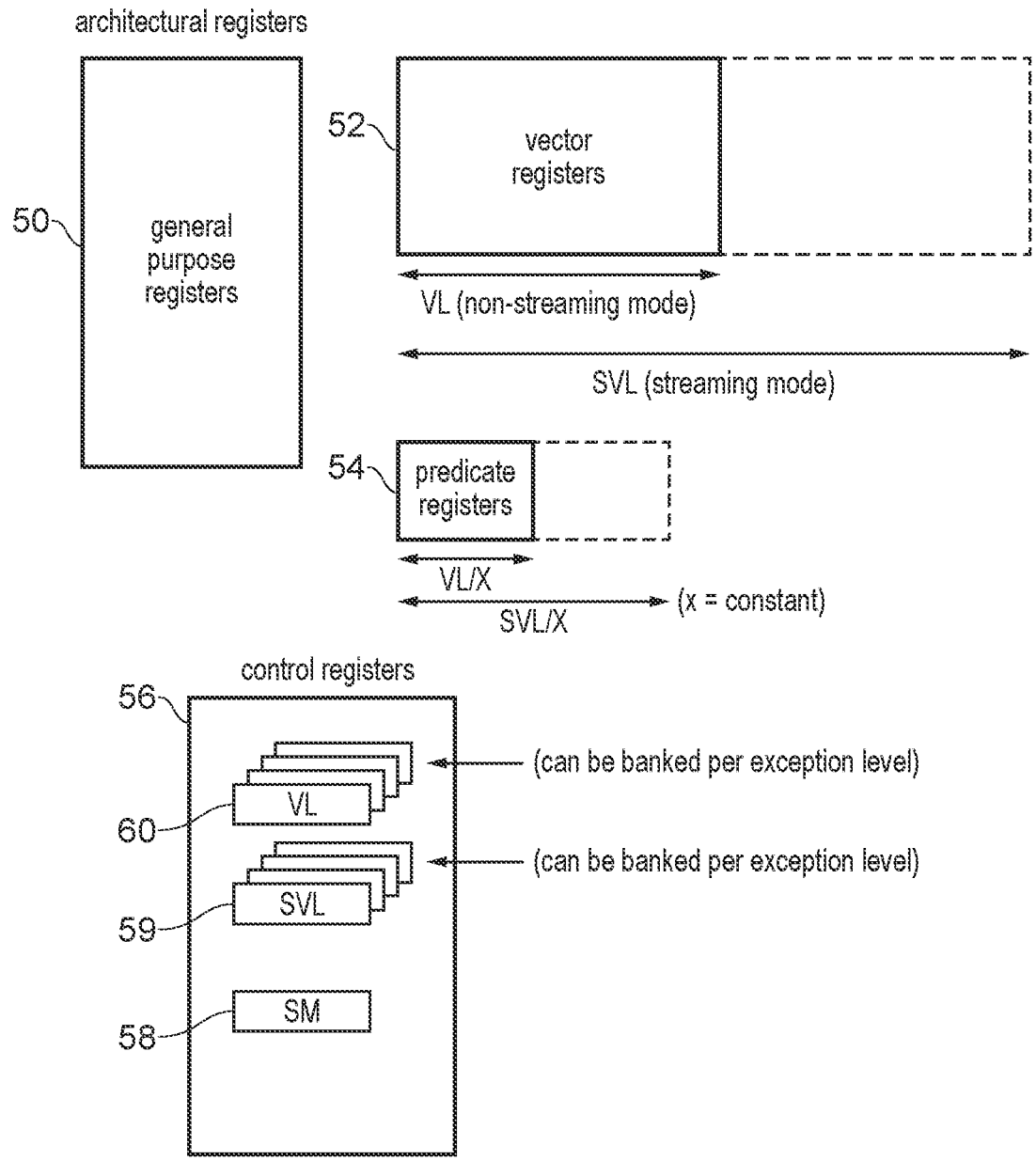
FIG. 2 illustrates sets of architectural registers.

According to the present techniques, a delegable memory access instruction is any memory access instruction that is capable of being offloaded for performance by an external processing unit, such as the CME unit 20, instead of the CPU 10. In particular, the offloading circuitry 16 is configured to transmit a request via the CME interface 35 to the CME unit 20, such that the delegable memory access is performed by the load/store unit 22 of the CME unit 20 instead of the load/store unit 14 of the CPU 10. It will be appreciated that the classification of memory access instructions that are identified as delegable memory access instructions will depend on the architecture of the external processing unit. In the specific example of FIG. 1, the CME unit 20 is configured to handle scalable vector/matrix instructions defined in a scalable vector/matrix instruction set architecture (ISA). FIG. 2 illustrates sets of architectural registers available for referencing by instructions encoded according to the ISA supported by the system 1. FIG. 2 does not show the physical register files provided in hardware (for example in the processor core 12 or the register file 24) for implementing these architectural registers, but merely shows which registers are logically available for referencing by instructions. In this example, the ISA supports:

- a general purpose register set 50 comprising general purpose registers for specifying scalar operands for scalar processing operations;
- a vector register set 52 comprising vector registers for specifying vector operands for vector processing operations, matrix operations or other SIMD operations;
- a predicate register set 54 comprising predicate registers for specifying predicate values for predicating vector, matrix or other SIMD operations; and.
- a set of control registers 56 for storing control values for controlling operation of the CPU 10. Information stored in the control registers may be set automatically in response to certain events, or can be programmable based on execution of a system register updating instruction.

The ISA supported by the system 1 is a scalable vector ISA (also known as a "vector length agnostic" vector ISA) supporting vector instructions operating on vectors of scalable vector length to enable the same instruction sequence to be executed on apparatuses with hardware supporting different maximum vector lengths. This allows different hardware designers of processor implementations to choose different maximum vector lengths depending on whether their design priority is high-performance or reduced circuit area and power consumption, while software developers need not tailor their software to a particular hardware platform as the software written according to the scalable vector ISA can be executed across any hardware platform supporting the scalable vector ISA, regardless of the particular maximum vector length supported by a particular hardware platform. Hence, the vector length to be used for a particular vector instruction of the scalable vector ISA (and hence also the predicate length of the corresponding predicate registers 54) is unknown at compile time (neither defined to be fixed in the ISA itself, nor specified by a parameter of the software itself). The operations performed in response to a given vector instruction of the scalable vector ISA may differ depending on the vector length chosen for a particular hardware implementation (e.g. hardware supporting a greater maximum vector length may process a greater number of vector elements for a given vector instruction than hardware supporting a smaller maximum vector length). An implementation with a shorter vector length may therefore require a greater number of loop iterations to carry out a particular function than an implementation with a longer vector length.

The vector length agnostic property of the scalable vector ISA is useful because within a fixed encoding space available for encoding instructions of the ISA, it is not feasible to create different instructions for every different vector length that may be demanded by processor designers, when considering the wide range of requirements scaling from relatively small energy-efficient microcontrollers to servers and other high-performance-computing systems. By not having a fixed vector length known at compile time, multiple markets can be addressed using the same ISA, without effort from software developers in tailoring code to each performance/power/area point.

To achieve the scalable property of the scalable vector ISA, the functionality of the vector instructions of the scalable vector ISA is defined in the architecture with reference to a parameter (e.g. VL 60 or SVL 59 as shown in FIG. 2, described in more detail below) which indicates the vector length in use (when considering the maximum vector length supported in hardware and any software-defined limitations using the control registers 56), where that parameter VL or SVL is unknown at compile time. Hence, execution of the same vector instruction on different systems may produce different results (typically varying in terms of the number of vector elements generated, a subset of which may have the same result values on different platforms, but in general platforms implementing a greater vector length may generate additional vector elements in comparison with a platform implementing a smaller vector length). Predicate values defined in the predicate registers 54 may be used to control which elements are generated in a given instance of an instruction and can be set based on vector length agnostic principles such as by using comparison instructions to automatically generate the values of predicate for a particular loop iteration or applying some generally-defined predicate pattern which can scale to different vector lengths. Certain instructions may update loop control parameters such as an element count value to track how many vector elements have been processed so far so that across all iterations of a loop as a whole both the implementations with wider and narrow vector lengths may eventually achieve the same results but with different levels of performance, since the implementation with a wider vector length may require fewer loop iterations than an implementation with a narrower vector length.

This particular ISA also supports two different modes for executing vector operations: a non-streaming mode of operation and a streaming mode of operation. Mode indicating state information 58 stored in the control registers 56 indicates whether the current mode is the non-streaming mode or streaming mode, and can be set in response to execution of a mode changing instruction. Scalar operations using the general purpose registers 50 may be processed in the same way regardless of whether the current mode is the non-streaming mode or the streaming mode, but operations using the vector registers 52 and predicate registers 54 may be processed differently depending on whether the current mode is the streaming mode or the non-streaming mode.

In the non-streaming mode, vector registers 52 are architecturally designated as having a vector register length VL identified by a non-streaming vector length specifying value 60 specified in the control registers 56, and the predicate registers 54 are architecturally designated as having a register length VL/X, where X is a constant corresponding to a minimum vector element size supported (e.g. X may equal 8 for an implementation where the smallest vector element size is 8 bits). In the streaming mode, vector registers 52 are architecturally designated as having a streaming mode vector length SVL identified by a streaming vector length specifying value 59 specified in the control registers 56, and the predicate registers 54 are architecturally designated as having a register length SVL/X. Hence, both the vector registers 52 and predicate registers 54 may logically be seen as changing register length when there is a change of mode between the streaming mode and the non-streaming mode.

Both the non-streaming vector length specifying value 60 and streaming mode vector length specifying value 59 may be implemented in different ways. In some examples, these vector length specifying values 60, 59 could simply be a hardwired piece of state information which is not programmable by software, and simply indicates the maximum register length supported each mode by the hardware. This can then be read by software to identify the particular vector length implemented on the hardware executing the program, so that the same software can execute with different vector lengths on different hardware.

In other examples, the ISA may support more privileged software being able to limit the maximum vector length which is usable by software executing in a less privileged state. For example, to save power a given piece of software could be limited so that it cannot make use of the full vector length supported in hardware. Hence, the vector length specifying values 60, 59 could include information settable by software, to specify the vector length to be used in each mode 60, 59. Nevertheless, even if the more privileged software applies a limit on vector length, the vector length for the application software is still unknown at compile time because it will not be known whether the actual implemented vector length in a particular processor will be greater or less than the limit defined in the length specifying value 60, 59. For implementations with hardware supporting a smaller maximum vector length than the limit defined in the length specifying value 60, 59, a smaller vector length than indicated by the limit will actually be used. For example, the effective vector length seen by software may correspond to the minimum of the maximum vector length supported in hardware for the current mode and the vector length limit set by software. The vector length specifying values 60, 59 may be banked per exception level so that different limits on maximum vector length supported may be specified for software executing in different exception levels (e.g. software at one exception level may be allowed to use a longer vector length than software at another exception level).

Hence, there can be a variety of ways in which control state information stored in the control registers 56 may influence the vector length useful vector operations, but in general some state information is available which can enable software to determine the effective vector length used for each mode.

It can be useful to support both the non-streaming modes and streaming modes, as this can provide greater flexibility for hardware microarchitecture designers to introduce an external processing apparatus such as the CME unit 20 shown in FIG. 1, as the architecturally defined mode of processing and separate vector length indicating values 60, 59 for the respective modes makes it simpler for the hardware to determine when instructions requiring vector registers should be offloaded to the CME unit 20 or executed within the local execution units of the CPU 10. It also allows software to explicitly designate whether a particular workload would be more suited for execution on the general purpose execution units in the core 12 of the CPU 10 or on the more bespoke hardware of the CME unit 20. This can be useful because for vector processing routines requiring smaller vectors and/or workloads where vector operations are interspersed with scalar operations, it may be more appropriate for the vector operations to be processed on the general purpose execution units in the core 12 of the CPU 12, while the CME unit 20 may be more suited to processing "streaming" workloads which require high throughput of vector operations on large datasets with relatively little need for intervening scalar operations (e.g. workloads associated with machine learning applications such as neural network processing). To simplify micro-architecture implementation, a register resetting operation may be performed to ensure that reads of the vector registers 52 and predicate registers 54 following a mode change between streaming/non-streaming modes return a predetermined value (e.g. zero) if they occur after the mode change without any intervening write to that register since the mode change. This avoids the need to transfer data between registers in the CPU 10 and registers in the CME unit 20 on the mode change, as the ISA specifies that software should assume that the architectural state in the vector registers 52 and predicate registers 54 are cleared on a mode change.

For such streaming workloads, longer vector lengths may be useful to reduce the instruction fetch/decode overhead associated with processing a given number of vector elements. Hence, although the ISA does not require it (the vector length for non-streaming mode may be selected from among a certain set of vector lengths supported, and the streaming mode vector length may be selected from among a second set of vector lengths supported, with no fixed relation between the length selected for non-streaming mode and streaming mode), in implementations which choose to provide an external processing unit such as the CME unit 20 for supporting the streaming vector mode, it is relatively likely that the streaming mode vector length may be greater than the non-streaming mode vector length, in some cases many times greater. As just one example (other lengths can also be used), an implementation might choose to implement a maximum vector length of 128 bits in the non-streaming mode and 512 bits in the streaming mode, with the predicate registers therefore having an architectural vector length of 16 bits in the non-streaming mode and 64 bits in the streaming mode. When an external processing apparatus is provided, vector instructions executed in the streaming mode would be expected to run on the CME unit 20 which may have, within its physical register files, physical registers of sufficient size to handle the maximum streaming mode vector length. Therefore, there may be no need for any vector physical register file in the CPU 10 to expand beyond the maximum vector length supported for the non-streaming mode.

The streaming workloads that are particularly of note for use with the present techniques include loading or storing vectors and matrices. SIMD memory access instructions executed in the streaming mode are identified as the delegable memory access instructions by the offloading circuitry 16 and are executed on the CME unit 20 for greater efficiency. It will be appreciated, however, that the present techniques can also be applied to other classifications of delegable memory accesses where an external processing apparatus is designed according to a different architecture. For example, the delegable accesses could be memory accesses associated with cryptographic operations being performed by an external cryptographic processing unit. Nonetheless, the following examples will continue the example of the CME unit 20 being the external processing apparatus.

Figure 3:
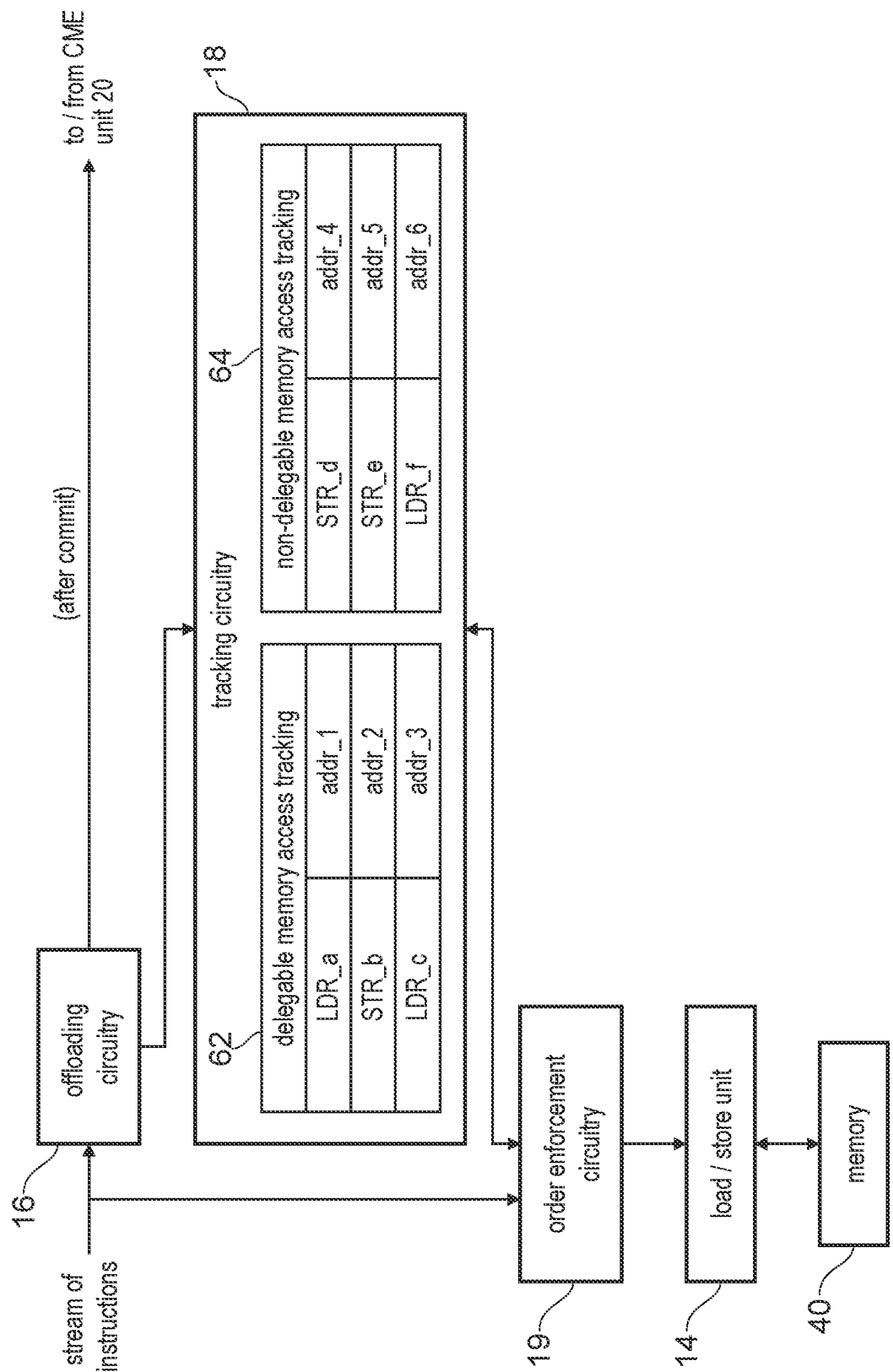
FIG. 3 illustrates an apparatus comprising tracking circuitry and order enforcement circuitry.

FIG. 3 schematically illustrates the apparatus according to the present techniques in greater detail. A stream of instructions is monitored by the offloading circuitry 16 to identify delegable memory access instructions to be performed by the CME unit 20, and non-delegable memory access instructions to be performed by the local load/store unit 14. When an identified delegable memory access has been committed (for example, after verifying that performance of the memory access and the use of particular operands is correct), the offloading circuitry 16 issues a request to the CME unit 20 to perform the memory access. Waiting for the delegable memory instruction to be committed is beneficial since the CME unit 20 may be configured to only handle the delegable memory accesses in program order. Accordingly, the delegable memory accesses are sent to the external processing apparatus in program order. The offloading circuitry may include in the request any information necessary for the CME unit 20 to perform the memory access, such as, in one particular example, an indication of the target memory address and whether the memory access is a load or a store. As noted further below for FIG. 5, in an embodiment using a region table, it is not necessary to provide an indication of the target memory address itself, as part of the address can be represented by an index into a region table.

In response to the offloading circuitry 16 identifying delegable memory accesses, the tracking circuitry 18 is configured to maintain tracking information representing the target addresses of the delegable memory accesses in a delegable memory access tracking structure 62. In this example, the delegable memory access tracking structure comprises entries specifying: a load LDR_a with a representation of the target address addr_1; a store STR_b with a representation of the target address addr_2; and another load LDR_c with a representation of the target address addr_3. Note that the target addresses being marked with a different number does not necessarily mean that the target addresses are different. For example, addr_2 and addr_3 may be the same target address. The delegable memory access tracking structure 62 is maintained so that the entries are representative of a program order. In this example, the program order is implicit by the ordering of the memory accesses in the tracking structure. In particular, LDR_a is earlier in the program order than STR_b, which is earlier in the program order than LDR_c. In other examples, the delegable memory access tracking structure 62 can explicitly include an indication of program order in each entry.

The delegable memory access tracking structure 62 is implemented separately to a tracking structure used for tracking non-delegable memory accesses, such as non-delegable memory access tracking structure 64. In this example, the entries of the non-delegable memory access tracking structure 64 specify: a store STR_d with a representation of the target address addr_4; another store STR_e with a representation of the target address addr_5; and a load LDR_f with a representation of the target address addr_6.

It will be appreciated that, while the example of FIG. 3 shows the non-delegable memory access tracking structure 64 as being maintained by the same tracking circuitry 18 as the delegable memory access tracking structure 62, this is not necessary. In other examples, the non-delegable memory access tracking structure 64 may be maintained by a different tracking circuit, such as a load/store queue coupled with the load/store unit 14. In still other examples, non-delegable memory accesses may be separated such that one tracking structure tracks load operations, and another tracking structure tracks store operations.

The tracking information may represent the target address of the delegable memory accesses in several different ways. The tracking information may comprise the target address itself, or may comprise only part of (e.g. the higher order bits of) the target address. Alternatively, the tracking information may comprise a reference to a further memory address tracking structure.

When a stream of instructions comprises both delegable and non-delegable memory access instructions, any ordering requirements may still need to be enforced as though all of the instructions had been performed on the same apparatus (e.g. by the load/store unit 14). Accordingly, the order enforcement circuitry 19 is configured to detect a risk of ordering hazards that could violate those ordering requirements. For example, an ordering hazard could occur if a non-delegable memory access is to be performed by the local load/store unit 14 before an older (earlier in program order) delegable memory access has been performed by the load/store unit 22 of the CME unit 20.

In accordance with the present techniques, when a given non-delegable memory access specifying address information is to be performed, the order enforcement circuitry 19 may perform a lookup of the address information in the delegable memory access tracking structure 62. If there is a delegable memory access that (i) is earlier in program order and (ii) is directed to a corresponding memory address, then an ordering hazard is detected. Accordingly, the order enforcement circuitry 19 prevents the load/store unit 14 from performing the given non-delegable memory access before the corresponding delegable memory access has completed. However, if an ordering hazard is not detected, then the order enforcement circuitry 19 is configured to permit (subject to any further ordering requirements between non-delegable memory accesses) the given non-delegable memory access to be performed before the corresponding delegable memory access has completed. According to this technique, it is possible to verify whether an ordering hazard will not be present, and hence whether the given non-delegable memory access can be performed out-of-order, and in particular earlier.

Note that for the target address to "correspond" as described above, it is not necessary for the memory addresses of the two memory accesses to be entirely identical. It is sufficient for the memory address to belong to the same predefined region of memory 40. It will be appreciated that a region could be simply defined by a number of higher-order bits in the memory address. For example, two 16-bit memory addresses can be said to correspond or belong to the same region of memory 40 if the first 8 bits are matching. By checking that the memory addresses only correspond within the same region, the detection of the ordering hazard may be approximated with less stored tracking information, meaning that the delegable memory access tracking structure 62 may be made smaller. It will be appreciated that the number of 'false positives' would be proportional to the size of the regions of memory. In other words, the larger the regions, the more likely a detected ordering hazard is a false positive. Nonetheless, the absence of a detection of an ordering hazard will always correctly verify a lack of an ordering hazard.

Figure 4:
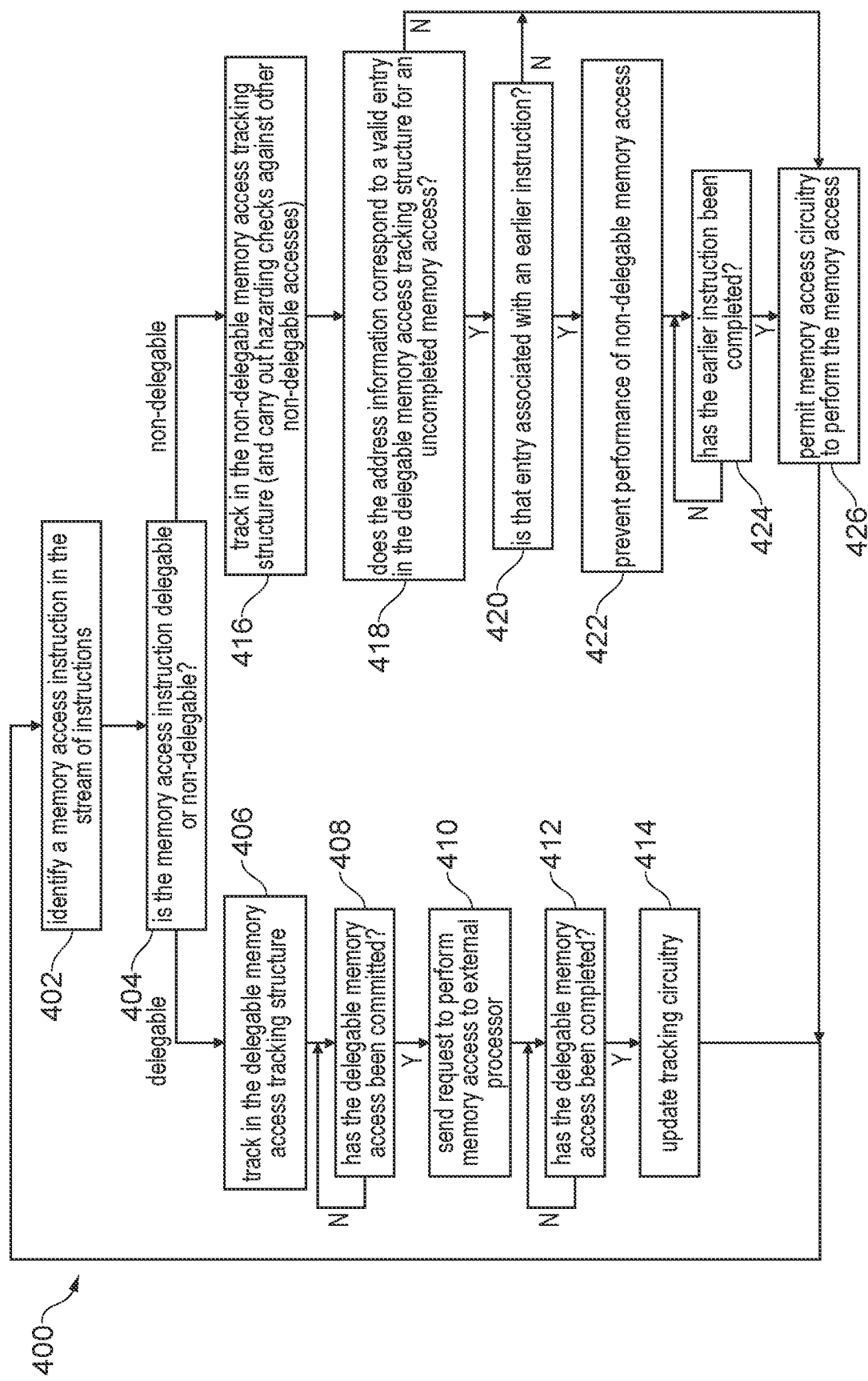
FIG. 4 illustrates a method of tracking memory accesses.

FIG. 4 illustrates a method 400 describing the functionality of the apparatus according to the present techniques. The process begins at step 402 where a memory access instruction is identified in the stream of instructions by the offloading circuitry 16. At step 404, the offloading circuitry identifies whether that memory access instruction is a delegable memory access instruction or a non-delegable memory access instruction (e.g. SIMD memory access operations executed in the streaming mode discussed above could be identified as delegable memory access instructions, while SIMD memory access operations executed in the non-streaming mode or scalar (non-SIMD) memory access operations may be identified as non-delegable memory access instructions).

If the memory access instruction is a delegable memory access instruction, the method moves to step 406 and begins tracking the delegable memory access in the delegable memory access tracking structure 62.

In step 408, the process waits until the delegable memory access instruction has been committed, since only committed instructions can be sent to the CME unit 20 for performance. Specifically, in step 408, the delegable memory access instruction is checked for whether it has been committed or not. If not (i.e. "N" at 408), then the check repeats until it has been committed (i.e. "Y" at 408).

In step 410, once the delegable memory access instruction has been committed, the external processing apparatus (i.e. the CME unit 20) is requested to perform the delegable memory access. The request may include any information required by the CME unit 20 to perform the memory access, such as a target address and an indication of whether the memory access is a load or a store.

In step 412, the process waits until the delegable memory access has been completed by the CME unit 20. This could be indicated, for example by a completion notification being received from the CME unit 20. Specifically, in step 412, it is checked whether the delegable memory access has been completed by the CME unit 20. If not (i.e. "N" at 412), then step 412 repeats until the delegable memory access has been completed.

In step 414, the tracking circuitry is updated to indicate that the delegable memory access has been completed and/or is no longer outstanding. This could be done by invalidating the tracking information in the tracking circuitry 18 associated with the delegable memory access instruction.

Returning to step 404, if the memory access instruction is a non-delegable memory access instruction, the method moves to step 416 and begins tracking the non-delegable memory access in the non-delegable memory access circuitry. Also in step 416, various known forms of hazarding can be performed, for example by detecting address dependencies between memory accesses tracked in the non-delegable memory access tracking structure 64.

In step 418, a look up of the delegable memory access tracking structure 62 is performed to check for a valid entry for an uncompleted delegable memory access that corresponds to the address information of the non-delegable memory access. If there is no corresponding entry in the delegable memory access tracking structure 62 (i.e. "N" at 418), then the order enforcement circuitry 19 does not detect an ordering hazard between the non-delegable memory access and any uncompleted delegable memory accesses. Accordingly, the memory access circuitry (i.e. the load/store unit 14) is allowed to perform the non-delegable memory access out-of-order (subject to any further order requirements between non-delegable memory accesses) at step 426. However, if there is a corresponding entry in the delegable memory access tracking structure 62 (i.e. "Y" at 418), then there could be an ordering hazard detected. Accordingly, the process moves to step 420.

In step 420, it is checked whether the corresponding entry in the delegable memory access tracking structure 62 is associated with an instruction that is earlier in program order than the instruction identified in step 402. If not (i.e. "N" at 420), then the order enforcement circuitry 19 does not detect an ordering hazard between the non-delegable memory access and the delegable memory access associated with the corresponding entry. Accordingly, the memory access circuitry is allowed to perform the non-delegable memory access at step 426 out-of-order subject to any further ordering requirements between non-delegable memory accesses. However, if the corresponding entry in the delegable memory access tracking structure 62 is associated with an instruction earlier in program order than the instruction identified in step 402 (i.e. "Y" at 420), then the order enforcement circuitry 19 detects a risk of an ordering hazard.

In step 422, the order enforcement circuitry 19 prevents the non-delegable memory access from being performed while the risk of an ordering hazard exists. In particular, the risk of an ordering hazard exists until the earlier delegable memory access instruction has been completed. In step 424, it is checked whether the earlier delegable memory access instruction has been completed. As above, this could be indicated by a completion notification received from the CME unit 20. If the earlier delegable memory access instruction is not completed (i.e. "N" at 424), the step repeats until the earlier delegable memory access instruction is completed (i.e. "Y" at 424) and the process moves on to step 426.

In step 426, the order enforcement circuitry 19 permits the memory access circuitry to perform the non-delegable memory access subject to any further ordering requirements between non-delegable memory accesses. Due to the above-described detection of the ordering hazard, the non-delegable memory access is performed in-order relative to the corresponding delegable memory access.

Figure 5:
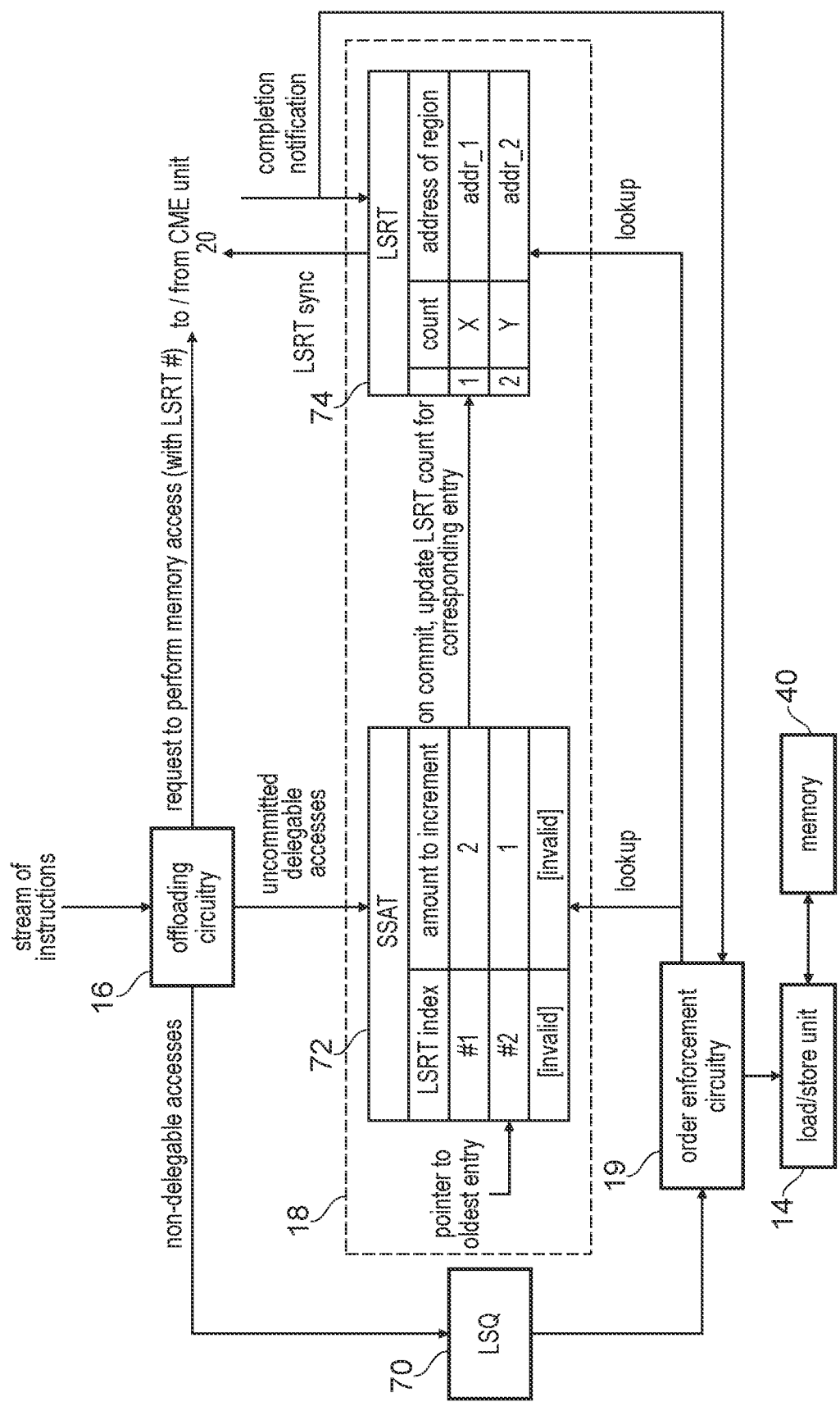
FIG. 5 illustrates an apparatus comprising a speculative stream address table and a load-store region table.

FIG. 5 schematically illustrates another example of the apparatus according to the present techniques. The offloading circuitry 16 may operate similarly to previous examples, in that it monitors a stream of instructions to identify delegable memory access instructions and non-delegable memory access instructions. In this example, the non-delegable memory access tracking structure 64 of previous examples is embodied by a load/store queue (LSQ) 70. It will be appreciated that various configurations of LSQ 70 that indicate the address information of non-delegable memory accesses could be used in conjunction with the present techniques. In some examples, the LSQ 70 may comprise separate structures for tracking non-delegable load accesses and non-delegable store accesses respectively.

The tracking circuitry 18 of FIG. 5 maintains, as the tracking information associated with delegable memory accesses, a speculative streaming address table (SSAT) 72 and a load/store region table (LSRT) 74. The LSRT 74 comprises a plurality of entries, each defining a region of memory 40 accessed by at least one delegable memory access. The region may be defined in several different ways, such as by specifying a portion (i.e. the higher-order bits) of a memory address contained within the region or by specifying a start/end memory address and a size of the region. The entries of the LSRT 74 also contain a counter associated with each region to indicate the number of committed but uncompleted delegable memory accesses made to a particular region of memory 40. In FIG. 5, it can be seen that there are X memory accesses to a memory region defined by addr_1 and Y memory accesses to a memory region defined by addr_2 currently being performed by the CME unit 20. In accordance with the present techniques, the LSRT 74 provides tracking information for delegable memory accesses and is synchronised with a corresponding LSRT maintained by the CME unit 20. Accordingly, since both of the CPU 10 and the CME unit 20 will know the same association between the location of a memory region and the index of the LSRT, the request to perform the delegable memory access sent from the offloading circuitry 16 can simply specify an index of the LSRT 74 and an offset value (representing the offset of the target address relative to the region start address) instead of the entire target address of the delegable memory access. This reduces the amount of data that must be transmitted between the CPU 10 and the CME unit 20 when offloading the delegable memory accesses. In particular, for multiple accesses to the same memory region, the entire target address is only transmitted once (i.e. during the synchronisation), with each access represented in the offloading request using the region table index in place of the full region address. As such, the power usage in offloading the instructions can be reduced.

The SSAT 72 comprises a plurality of entries representing memory accesses that have been identified as delegable memory accesses by the offloading circuitry 16 but have not yet been committed. Accordingly, the SSAT 72 acts as a buffer to speculatively track delegable memory access with the expectation that those delegable memory access will be performed by the CME unit 20. When a delegable memory access is committed, the LSRT 74 is updated based on the entry in the SSAT 72. In particular, the counter associated with the region of memory is incremented by the amount specified in the SSAT 72 entry. When that delegable memory access is completed by the CME unit 20, the CME unit 20 sends a completion notification to decrement the counter.

To reduce the amount of data to be stored in the SSAT 72, each entry may specify one of the regions defined in the LSRT 74 using the index of the LSRT 74. Additionally, multiple delegable memory accesses in a row to the same memory region can be represented with a single entry indicating the number of those delegable memory accesses. In the example of FIG. 5, the entry specifying a delegable memory access to LSRT #1 indicates that the counter should be incremented twice. This means that there are two delegable memory accesses to that memory region in a row. Accordingly, the SSAT 72 may make more efficient use of the available slots so as to track more delegable memory accesses.

The SSAT 72 is arranged to be representative of a program order of the delegable memory accesses. Some examples may include an explicit program order ID stored in association with each entry. Other examples may represent program order implicitly by indexing the entries in the SSAT 72 by a program order ID (which is maintained according to a common ID scheme used for both delegable and non-delegable accesses so that the relative order between delegable and non-delegable accesses can be determined based on their program order IDs). In FIG. 5, the SSAT 72 includes a pointer to the oldest entry indexed according to the program order, with the entries with lower entries being generally younger than the higher entries. While new entries are allocated sequentially into the SSAT according to the program order IDs of the corresponding delegable accesses, invalid entries can be retained to indicate that a non-delegable memory access occurred at a point in the program order corresponding to that SSAT 72 index. To illustrate this, the program order of the entries in FIG. 5 show the oldest entry being one memory access to memory region #2, followed by an invalid entry to indicate a non-delegable memory access taking place, followed by two memory accesses to memory region #1.

As in previous examples, the apparatus comprises order enforcement circuitry 19 configured to enforce an ordering requirement between non-delegable and delegable memory accesses. When a given non-delegable memory access is ready to be performed (e.g. it is the next entry in the LSQ 70), the order enforcement circuitry 19 determines whether there is an ordering hazard based on a lookup of the SSAT 72 and the LSRT 74. In particular, the LSRT 74 lookup is to identify which region of memory 40 is targeted by the address information of the given non-delegable memory access. A lookup of the SSAT 72 is then performed to search for the index of the LSRT 74 that corresponds to the identified region of memory 40. It will be appreciated that, since the SSAT 72 lookup is based on an index value, which is likely very small, a second comparison of the memory address (or a portion of it) is not needed, thus saving power. If the SSAT 72 stores an entry to indicate that a delegable memory access is expected to be made to the same region of memory, and that delegable memory access is older (earlier in program order) than the given non-delegable memory access, then the order enforcement circuitry is configured to detect an ordering hazard. If a hazard is detected, the order enforcement circuitry 19 prevents the load/store unit 14 from performing the given non-delegable memory access until a completion notification is received. This ensures that the given non-delegable memory access is performed in order with respect to the delegable memory access. On the other hand, if the SSAT 72 does not contain an entry indicating such a delegable memory access, then the order enforcement circuitry 19 does not detect an ordering hazard and the given non-delegable memory access is allowed to be performed out-of-order by the load/store unit 14.

Figure 6:
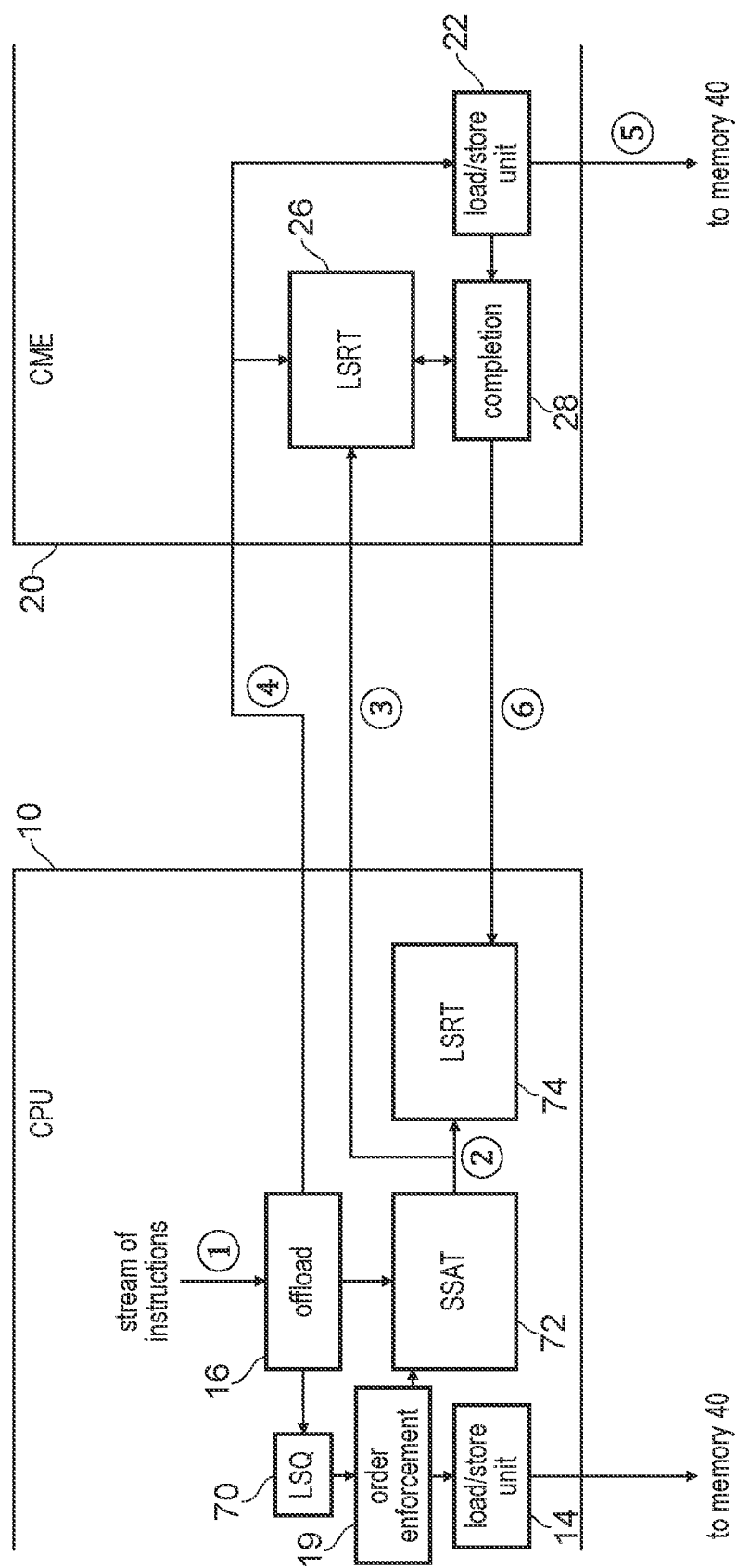
FIG. 6 illustrates an example of signalling between components of a data processing system.

FIG. 6 illustrates an example of the signalling that occurs between the CPU 10 and the CME unit 20 via the CME interface 35 in system 1, when CPU 10 comprises the apparatus of FIG. 5. The offloading circuitry 16 monitors the stream of instructions at (1) to identify delegable and non-delegable memory access instructions and allocates the associated memory accesses to the LSQ 70 or SSAT 72 accordingly.

Before a delegable memory access is committed (e.g. when the target address of a delegable memory access is determined and it is found that the target address does not correspond to any existing region already tracked in a valid entry of the LSRT 74), the SSAT 72 updates the LSRT 74 at (2). On an update of the LSRT 74 to allocate a new region, a synchronisation signal (3) is sent to the LSRT 26 in the CME unit 20 so that both LSRTs 74, 26 will be synchronised (the LSRT 26 at the CME 20 is updated to reflect the change made to the LSRT 74 in the CPU 10). Subsequently, in response to the delegable memory access being committed, the offload circuitry 16 requests that the CME unit 20 performs the delegable memory access at (4). The signal (4) may include any information for the CME unit 20 to perform the delegable memory access, such as an index of the LSRTs 74, 26, the lower-order bits of the target address (an offset relative to the region address stored in the entry of the LSRT represented by the index), and an indication of whether the delegable memory access is a load or a store. The request is received by the load/store unit 22 in the CME unit 20, which then performs the delegable memory access at (5) based on the region specified in the LSRT 26.

Completion circuitry 28 in the CME unit 20 recognises when the delegable memory access has been completed by the load/store unit 22, and sends a completion notification to the CPU 10 a (6). This completion notification is received by the LSRT 74 and causes the counter associated with the region of memory accessed by the delegable memory access to be decremented. The completion notification may also be received by the order enforcement circuitry 19 for enforcing an ordering requirement as described above, to allow any stalled non-delegable memory access that was stalled due to a hazard to be unblocked and forwarded for processing by the load/store unit 14.

As described above, since the region address is only transferred during the synchronisation (3) of the LSRTs 74, 26, subsequent signals (i.e. the offloading request (4)) sent for the offloaded memory accesses can simply refer to the index of the LSRTs 74, 26, thus saving power for each subsequent signal.

FIG. 7A illustrates an example of the LSRT 78 comprising a plurality of counters, each counter relating to a sub-region of the region of memory 40. This provides a finer granularity for the tracking outstanding delegable memory access request, which in turn provides greater accuracy for detecting ordering hazards.

Figure 7B:
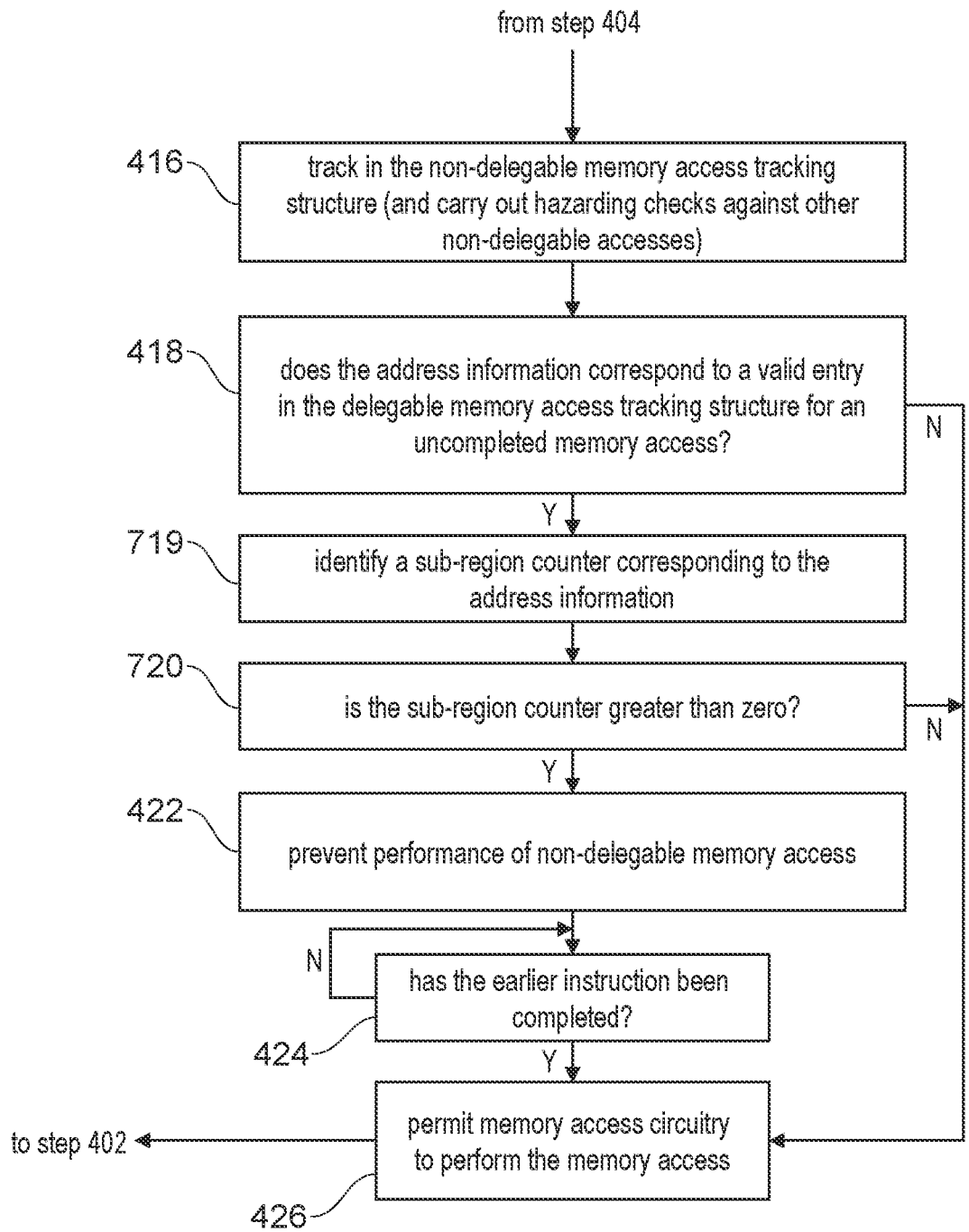
FIG. 7B illustrates a portion of a method of tracking memory accesses.

FIG. 7B illustrates a modified part of the method steps shown in FIG. 4. In particular, the illustrated steps relate to the branch after the memory access instruction is identified as a non-delegable memory access instruction at step 404. Steps 416 and 418 may be performed similarly to as described in FIG. 4. At step 719, the order enforcement circuitry 19 identifies which sub-region counter corresponds to the address information of the non-delegable memory access. For example, the sub-region counters may correspond to equally sized sub-regions, such that each of cnt0, cnt1, cnt2, cnt3 correspond to a quarter of the memory region addr_1. Hence, a portion of bits of the address information of the non-delegable memory access can be used to determine which sub-region the non-delegable memory access is directed to, hence identifying one of the sub-region counters.

At step 720 (replacing the previous step 420), it is determined whether the value of the sub-region counter is greater than zero. If so (i.e. "Y" at 720), then there is currently an uncompleted memory access being performed to that sub-region. Accordingly, the order enforcement circuitry detects a risk of an ordering hazard and prevents performance of the non-delegable memory access at step 422, as described previously. However, if the sub-region counter is equal to zero (i.e. "N" at 720), then there are no uncompleted memory accesses being performed to that sub-region and hence there is no ordering hazard present. Accordingly, the order enforcement circuitry permits the memory access circuitry to perform the non-delegable memory access (subject to any other order requirements between non-delegable memory accesses) at step 426.

In contrast from FIG. 4, it will be appreciated that the detection of an ordering hazard according to FIG. 7B will be more accurate, since the finer granularity of the memory regions reduce the likelihood of 'false positives'. Therefore, the likelihood of being able to perform the non-delegable memory access out-of-order, and hence improving performance, is increased.

Figure 8:
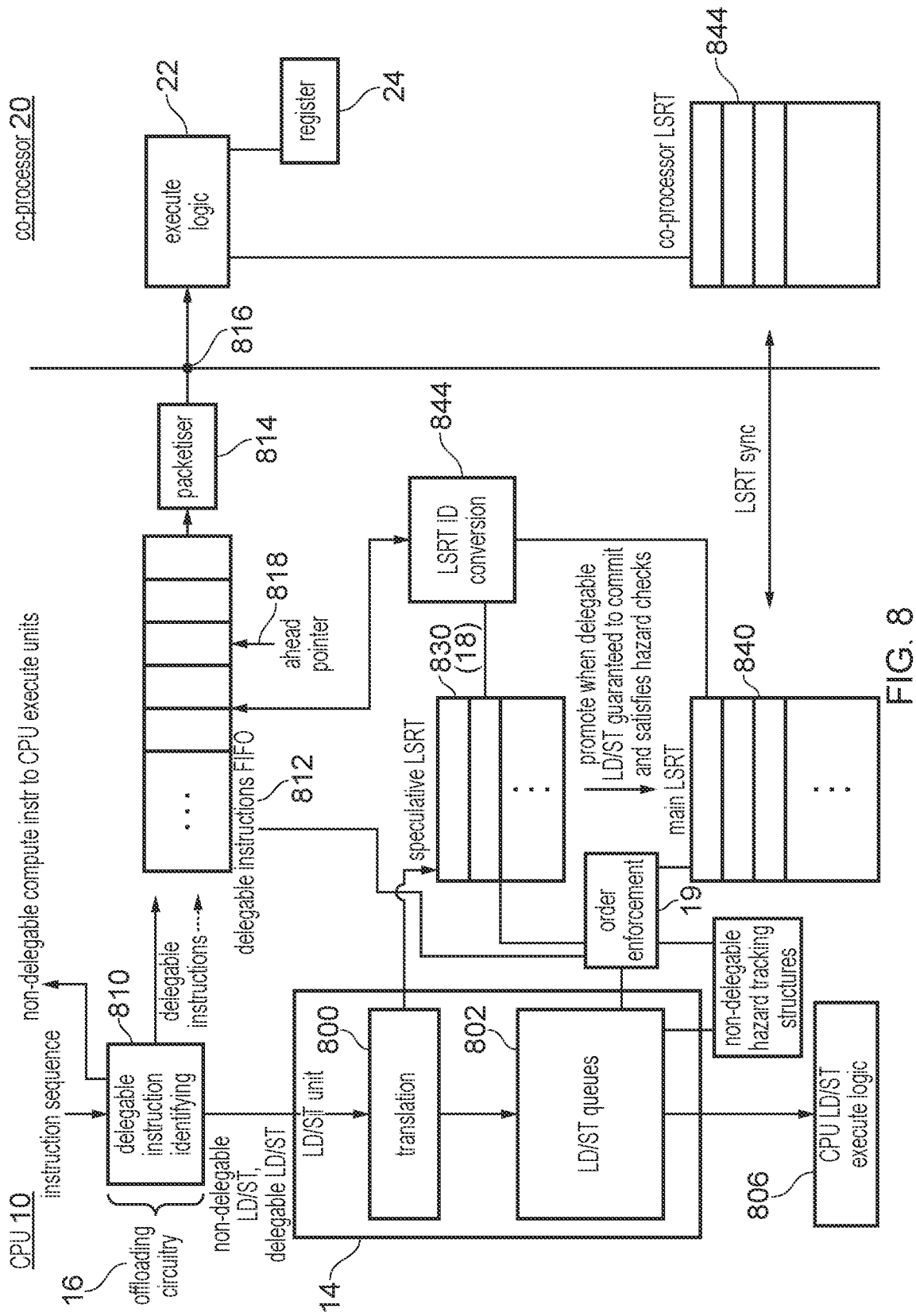
FIG. 8 illustrates another example apparatus comprising offloading circuitry, tracking circuitry and order enforcement circuitry.

Another example is shown in FIG. 8. As in the earlier examples, the apparatus 10 (e.g. a CPU) comprises a load/store unit (an example of memory access circuitry) 14 which performs memory accesses in response to memory access instructions among a series of instructions to be executed, and offloading circuitry 16 for identifying, within the series of instructions, delegable instructions which are to be performed by an external processing apparatus 20 (e.g. a coprocessor, such as the CME unit mentioned earlier) instead of by the local execution units of the CPU 10. The delegable instructions can include various types of instructions, including delegable compute instructions (e.g. arithmetic/logical instructions) and delegable memory access instructions which specify a delegable memory access (load/store operation) to be performed by the coprocessor 20 instead of by the regular load/store execute units 806 of the CPU 10. For example, the delegable compute instructions and delegable memory access instructions may comprise scalable vector compute instructions and scalable vector load/store instructions executed in a streaming mode as discussed earlier with respect to FIG. 2. When a delegable instruction is identified, dispatch of a request to the coprocessor 20 to execute the instruction may be dependent on the instruction being committed, so the coprocessor 20 may not be capable of out of order execution or speculative execution. However, to enable delegable memory access instructions to leave the load/store unit 14 earlier when they are still to be committed, and hence free up slots which can be used for other non-delegable memory access instructions, tracking circuitry 18 is provided to maintain tracking information representing the target address of a delegable memory access in a delegable memory access tracking structure (in this example implemented as a speculative load/store region table (LSRT) 830 described in more detail below) separate from the regular non-delegable hazard tracking structures 804 used for hazard detection for regular non-delegable memory accesses. Order enforcement circuitry 19 enforces ordering requirements between non-delegable memory accesses and delegable memory accesses based on a lookup of address information associated with the given non-delegable memory access in at least the delegable memory access tracking structure 830 (order enforcement could also be dependent on lookups to other structures). In this way, performance can be improved because, in the relatively long periods when delegable memory accesses cannot yet be committed because they are waiting for earlier operations, the delegable memory accesses can leave the regular structures used for non-delegable memory accesses and so free up slots which other non-delegable memory accesses could use to be processed out-of-order if they are independent of delegable memory accesses still awaiting processing.

The load/store unit 14 comprises address translation circuitry 800 for performing address translations and load/store queues 802 for queuing pending load/store operations. Non-delegable hazard tracking structures 804 are provided to track addresses of in-flight load or store operations for ensuring that architectural ordering requirements are satisfied. For example, the structures 804 could include a read-after-read (RAR) buffer for tracking addresses and order of processing of load operations, for detecting violation of architectural ordering requirements (e.g. requirements that reads to the same address should be performed in program order or that barrier instructions may impose requirements to order other load operations in a certain way relative to the barrier), and/or a store buffer for tracking addresses and data of pending non-delegable store operations still to be written to the caches/memory and delegable store operations which have not yet cleared their hazard checks against non-delegable memory accesses (to allow for ordering of those stores relative to non-delegable loads), and/or a merge buffer for handling merging of non-delegable stores to the same address for efficiency reasons and to avoid write-after-write hazards. The order enforcement circuitry may also detect hazards between older store operations and younger load operations which could benefit from store-to-load forwarding (forwarding of the value to be written to memory by the store for use to form part of the load value to be returned to a register by the load). The address translation, load/store queuing and hazarding for non-delegable memory accesses may be performed according to any known technique. Once any hazard checks have been passed for a given non-delegable load/store operation, CPU load/store execute logic circuitry 806 executes the non-delegable load/store operation or confirms that the operation already initiated is correct (e.g. for a load reading data from a cache or memory to return data to be written to a register, the load request could be issued before the hazard checks have completed (and re-issued later after the hazard checks are complete if it is determined that the load violated ordering requirements the first time), while for stores that write data from a register to the cache or memory the store operation may not actually be performed until the hazard checks have passed).

The offloading circuitry 16 comprises delegable instruction identifying circuitry 810 for identifying the delegable instructions to be offloaded to the coprocessor 20, a delegable instruction queue (e.g. a first-in first-out buffer (FIFO)) 812 for queueing delegable instructions awaiting dispatch to the coprocessor 20, and a packetiser 814 for forming request packets to be dispatched to the coprocessor 20 over an interface 816. The request packets represent the series of delegable instructions to be processed by the coprocessor 20. To assist with packetisation, the delegable instruction queue maintains a runahead pointer 818 which identifies the entry of the next delegable memory access instruction to undergo a "swap" procedure for swapping LSRT identifiers (described in more detail), prior to packetisation.

The CPU 10 maintains a speculative LSRT 830 (an example of the delegable memory access tracking structure maintained by tracking circuitry 18) for tracking addresses of physical address regions accessed by pending delegable memory access instructions, for use in hazard checks against non-delegable memory accesses. Delegable memory accesses can cause allocation into the speculative LSRT 830 while they are still to be committed. A main LSRT 840 tracks physical address regions accessed by guaranteed-to-be-committed delegable memory access instructions still to be completed by the coprocessor 20 and is synchronised with a corresponding coprocessor LSRT 842 maintained by the coprocessor. Use of the LSRT 840 synchronised with the coprocessor's copy 842 allows the packets (requests) generated by the packetiser 814 to be smaller as they can use a smaller LSRT identifier as a proxy for the upper bits of the target address of a delegable memory access and other attributes relating to the target address, such as a physical address space identifier, memory attributes, shareability attributes, etc. The request packets also specify address offset bits representing the offset of the target address of a memory access relative to the physical region start address. A speculatively allocated LSRT entry in the speculative LSRT 830 can be promoted to the main LSRT 840 once the corresponding delegable memory access operation is guaranteed to commit and satisfies any hazard checks, and at this point LSRT identifier conversion circuitry 844 swaps the speculative LSRT entry identifier previously tracked in the delegable instruction queue 812 for that delegable memory access operation for an identifier of a corresponding entry in the main LSRT 840. If this causes a new entry to be allocated in the main LSRT, that new entry is synchronised with the coprocessor LSRT before the first instruction that uses that entry is dispatched to the coprocessor 20, so that the coprocessor has a record of the physical address regions that correspond to main LSRT identifiers which the coprocessor may receive in packets sent by the packetiser 814.

Figure 9A:
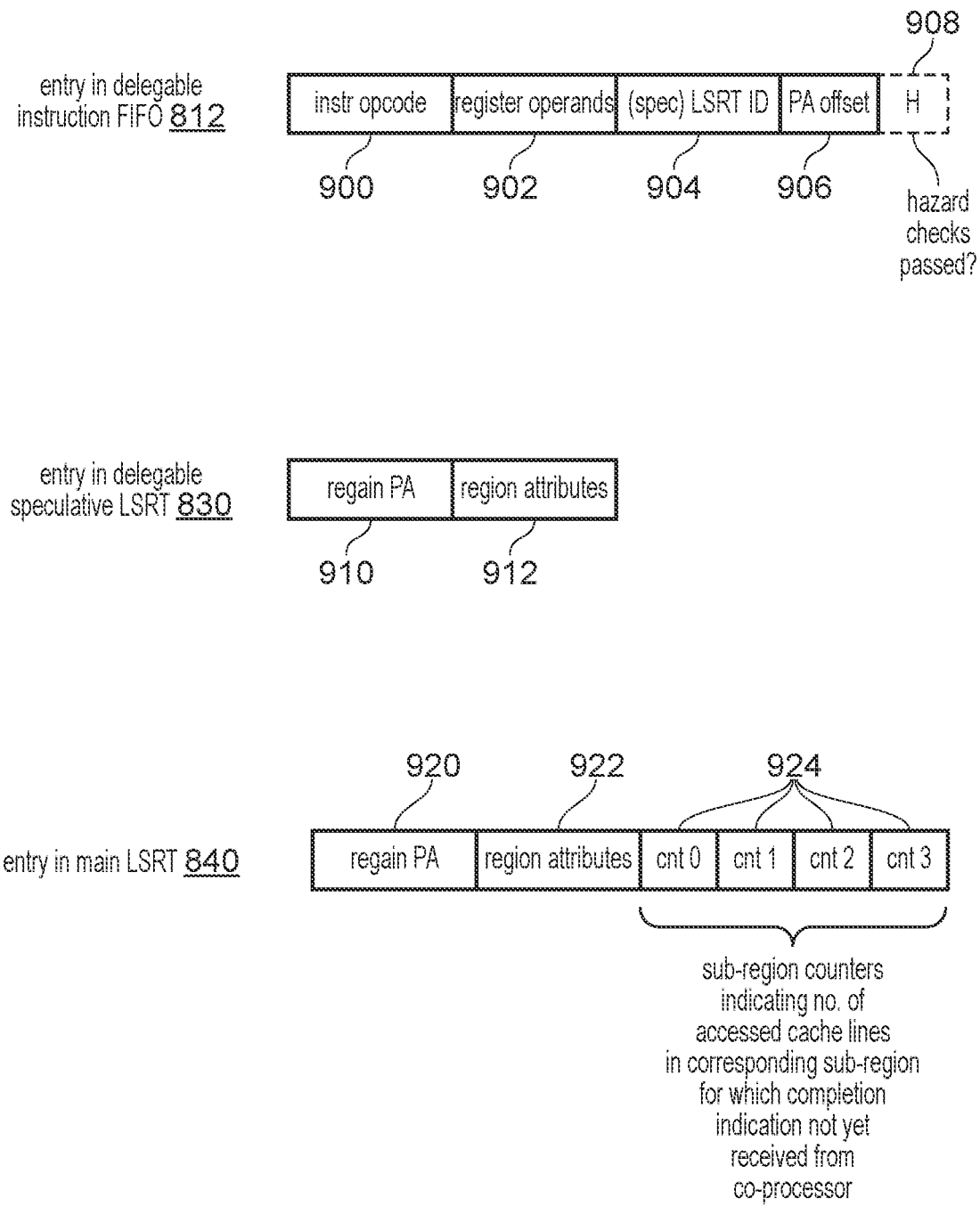
FIG. 9A illustrates entries for a delegable instruction queue, speculative region table (an example of a delegable memory access tracking structure) and region table.

FIG. 9A illustrates examples of entries of the delegable instruction queue 812, speculative LSRT 830 and main LSRT 840 respectively. It will be appreciated that while FIG. 9A shows some of the fields that can be provided in each type of entry, this is not exhaustive and other information not shown can also be included.

A given entry in the delegable instruction FIFO 812 comprises an instruction opcode 900 indicating the type of instruction to be executed and information identifying register operands 902 (if any) for that instruction. For delegable load/store operations, it is not necessary to encode register operands 902 for computing the target memory address of the load/store operation, as the address computation would already take place at the CPU 10 side to allow for translation and hazarding, so the address operands would not need to be transferred to the coprocessor 20 to allow the instruction to execute. Therefore, for delegable load/store operations the register operands 902 may comprise any data operands such as the source register from which a store operation is to store data to the cache/memory, or a destination register to which a load operation is to load data. Some delegable load/store operations could also have further register operands, such as a register specifying a compare value for a compare-and-swap operation.

For delegable memory access (load/store) operations, the delegable instruction FIFO entry also comprises an LSRT ID field 904 and a physical address (PA) offset field 906. The LSRT ID field 904 is used for identifying either a speculative LSRT entry in the speculative LSRT 830 (prior to the instruction undergoing ID conversion by the LSRT ID conversion circuitry 844) or a main LSRT entry in the main LSRT 840 that corresponds to that delegable instruction FIFO (after undergoing ID conversion). Hence, the same field 904 is reused for both the speculative LSRT identifier and the main LSRT identifier (this field could also be used for other purposes for delegable instructions other than memory access instructions). The PA offset field 906 specifies an offset of the target physical address of the memory access relative to the physical region address stored in the speculative/main LSRT entry identified by the identifier in field 904. Hence, when the memory access is offloaded to the coprocessor 20, instead of specifying the full physical address and other memory attributes associated with the address, the LSRT ID and PA offset can be specified, which typically requires fewer bits.

Optionally, for a FIFO entry corresponding to a delegable memory access, the delegable instruction queue entry can also specify a hazard flag 908 for indicating whether all required hazard checks have passed for the corresponding delegable memory access. Alternatively, the hazard flag 908 may not be necessary if signalling of readiness of an instruction to commit is delayed until it is determined that the required hazard checks have passed for that delegable memory access.

As shown in FIG. 9A, a given entry in the speculative LSRT 830 specifies a region physical address (PA), identifying a corresponding region of physical address space of a given size (e.g. 4 KB) that was accessed by at least one delegable memory access that has resolved its address translation. The entry also specifies region attributes 912 obtained for that region by the translation circuitry 800. The region attributes 912 include attributes derived from information stored in page tables which also define address translation mappings. For example, the region attributes 912 may specify a memory region type (e.g. device type or non-device type, which influences the extent to which the memory system is able to merge or reorder memory accesses), shareability attributes (used for controlling cache coherency in a multiprocessor system), physical address space identifier, etc. for the region. Allocation of a new entry into the speculative LSRT 830 is dependent on a translation being successful for a physical address in the corresponding region, so for a vector load/store instructions which is predicated out (based on predication information, it is determined there are no active vector elements to be processed), no address translation would be resolved for that instruction and so there would be no need to allocate a new speculative LSRT 830 entry even if, had there been an active vector element to be processed by that instruction, the target address of the instruction would have translated to a physical address in a new region requiring a new speculative LSRT entry to be allocated.

Each main LSRT entry similarly specifies a region PA 920 and region attributes 922 for a corresponding region of physical address space. A region can be promoted from the speculative LSRT 830 to the main LSRT when a corresponding delegable memory access accessing that region is guaranteed to be committed and has passed its hazard checks. The main LSRT entry also specifies at least one access counter 924 for counting a number of outstanding accesses to that region which are still to be completed by the coprocessor 20. In this example, there are four access counters 924, each corresponding to a different sub-region within the region associated with the main LSRT entry. For example, each counter 924 may correspond to a 1 KB sub-region with a 4 KB physical address region. When a delegable memory access undergoes its LSRT ID conversion step after being guaranteed to be committed, the corresponding access counter 924 for the sub-region comprising the target address of that access is incremented. When the coprocessor 20 confirms completion of a given delegable memory access, the corresponding access counter 924 for the sub-region comprising the target address of that access is decremented. The access counters 924 are used for hazard checks (see FIGS. 14 and 15 discussed below) and for determining when a main LSRT entry can be freed for reallocation once the access counters 924 indicate that there are no longer any outstanding accesses indicated for any of the sub-regions within the corresponding physical address region. While FIG. 9A shows an example with four sub-regions per region, other examples could have a different granularity of tracking accesses, so there could be more or fewer counters 924 per region (and in some cases there could be just a single counter 924 per region, counting the number of outstanding delegable memory accesses to the whole region without sub-division into sub-regions).

The main LSRT entry can also have information allowing identification of whether there is any outstanding delegable store operation associated with the physical address region tracked by that entry. For example, two separate sets of sub-region counters 924 could be maintained, one set for load operations and one set for store operations. Alternatively, the main LSRT entry could have a "store" indicator which simply indicates whether at least one store was detected for the corresponding region.

Figure 9B:
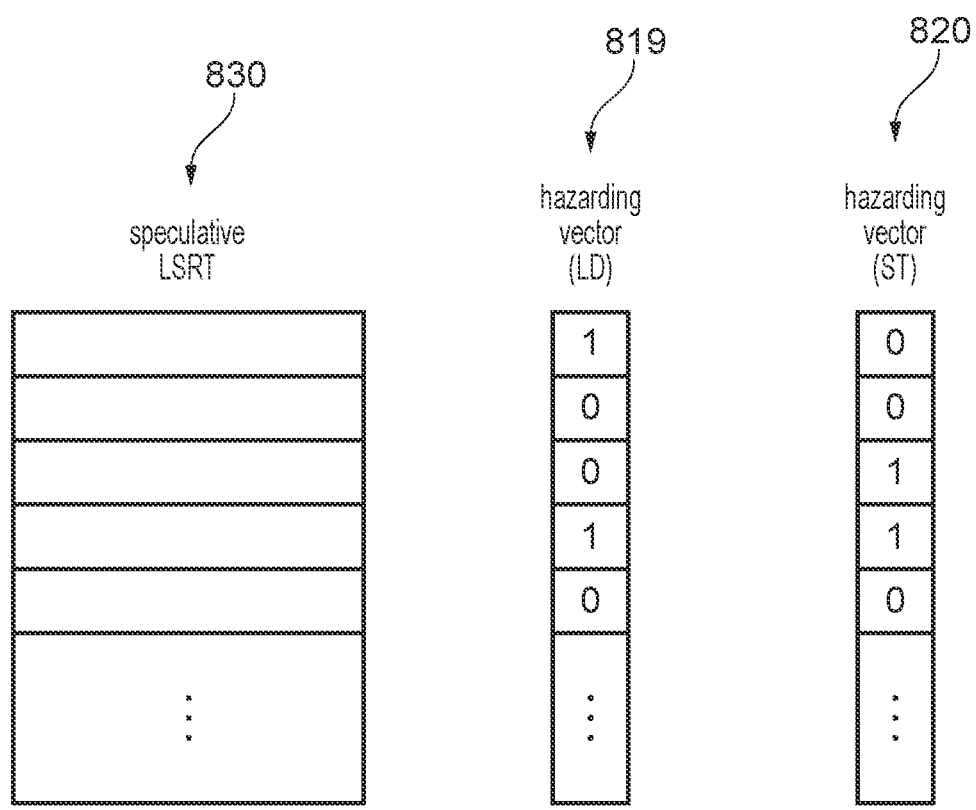
FIG. 9B illustrates use of vectors for tracking which speculative region table entries are associated with pending delegable load instructions or pending delegable store instructions which have passed their hazard checks.

As shown in FIG. 9B, to assist with hazard checking, a load hazarding vector 819 is maintained indicating which entries of the speculative LSRT 830 correspond to at least one delegable load instruction pending in the delegable instruction queue 812 which has passed its hazard checks, and a store hazarding vector 820 is maintained indicating which entries of the speculative LSRT 830 correspond to delegable store instructions pending in the delegable instruction queue 812 which has passed its hazard checks. The vectors 819, 820 are generated by decoding information in each instruction queue entry specifying the type of instruction (load/store/non-memory instruction), the speculative LSRT entry field 904 for each instruction queue entry, and (if provided) the hazard check flag 908 for each entry. Hence, ignoring any delegable instruction queue entries which relate to non-load operations, are invalid, or relate to load operations which have not yet cleared their hazard checks, the speculative LSRT entry fields 904 for the remaining instruction queue entries relating to loads that have passed their hazard checks are decoded to identify the set of LSRT entries which should be indicated in the load hazarding vector 819 as being relevant to hazard checks for younger non-delegable memory accesses. Similarly, ignoring any delegable instruction queue entries which relate to non-store operations, are invalid, or relate to store operations which have not yet cleared their hazard checks, the speculative LSRT entry fields 904 for the remaining instruction queue entries relating to stores that have passed their hazard checks are decoded to identify the set of LSRT entries which should be indicated in the store hazarding vector 820 as being relevant to hazard checks for younger non-delegable memory accesses. The vectors 819, 820 are updated live each cycle as new entries are allocated into the delegable instruction queue 812 and existing entries are updated. The hazarding vectors 819, 820 help to speed up hazard checks between non-delegable loads and delegable memory accesses, as they can qualify a lookup of the speculative LSRT 830 based on an address of a non-delegable load.

Figure 10:
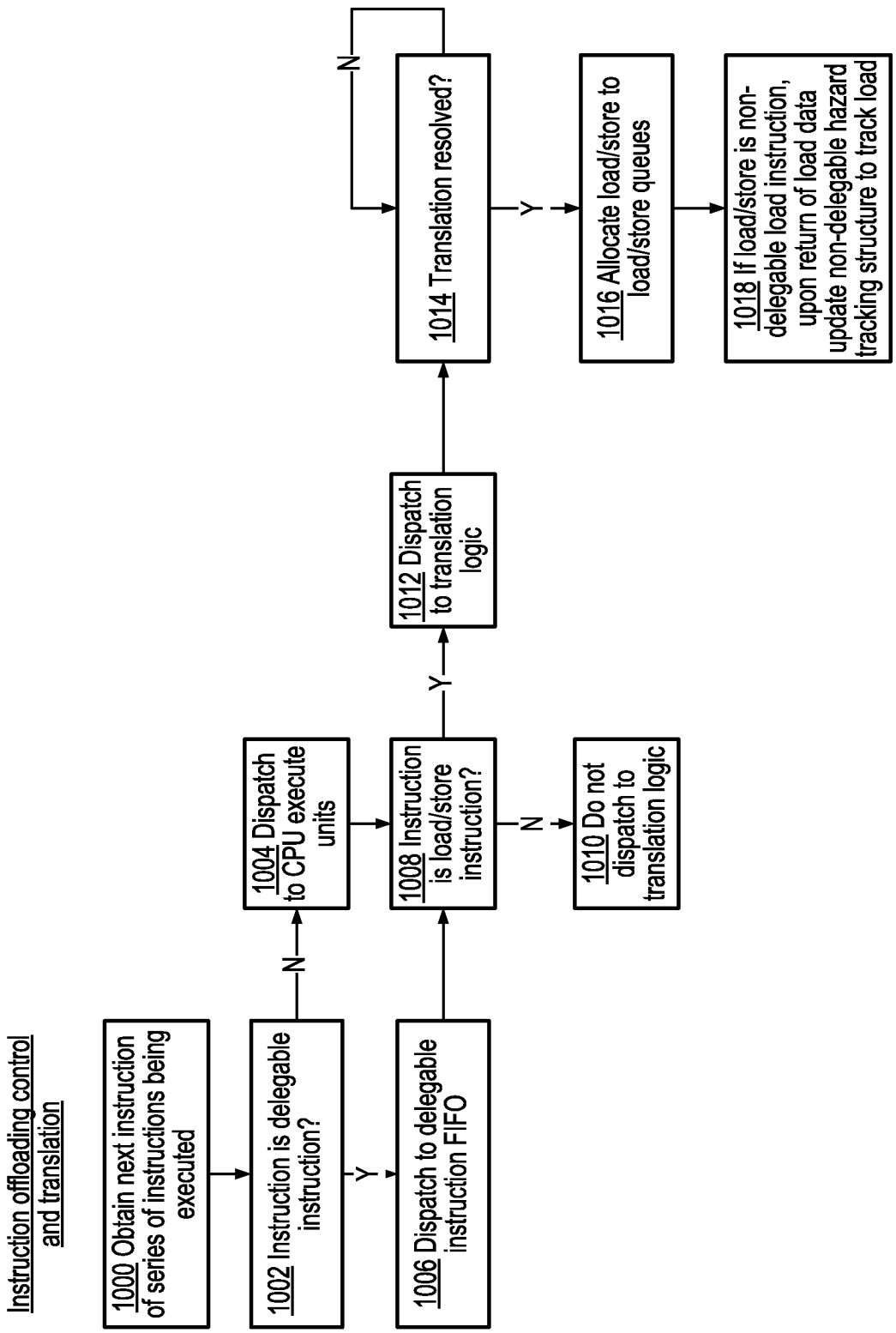
FIG. 10 illustrates instruction offloading control and translation.

FIG. 10 illustrates a method of performing instruction offloading control and address translation. At step 1000, the delegable instruction identifying circuitry 810 obtains the next instruction of the series of instructions being executed. At step 1002, the delegable instruction identifying circuitry 810 of the offloading circuitry 16 identifies whether the instruction is a delegable instruction to be offloaded to the coprocessor 20. For example, the delegable instruction identifying circuitry 810 may check the opcode of the instruction to identify whether the instruction is one of a subset of types of instructions that can be offloaded. Alternatively, rather than checking the actual opcode of the instruction, the delegable instruction identifying circuitry 810 could identify whether the instruction is delegable based on decoded information obtained by an instruction decoder at an earlier stage of processing which indicates whether the instruction is delegable. For example, a "delegable" hint may be passed down a processing pipeline from a decode stage to the stage at which instructions are offloaded to the coprocessor, to indicate whether the instruction is of a type which is delegable. Also, the delegable instruction identification may depend on the current mode of the processor. For example, an instruction of a delegable type (e.g. scalable vector instructions) could be considered a delegable instruction when executed in one mode (e.g. the streaming mode mentioned earlier) but may be considered a non-delegable instruction when executed in a different mode (e.g. the non-streaming mode). Hence, the same type of instruction could sometimes be treated as delegable and other times be treated as non-delegable, depending on the current mode of processing.

If the delegate or instruction identifying circuitry 810 identifies that the instruction is not a delegable instruction, then at step 1004 the instruction is dispatched for execution by the CPU's execute units 806 used for non-delegable instructions (the timing of execution may depend on hazarding and other checks).

On the other hand, if the instruction is a delegable instruction, then at step 1006 the instruction is dispatched to the delegable instruction queue (FIFO) 812. A new entry is allocated to the queue 812 specifying the instruction opcode 900 and registers 902 (other than address operand registers) to be accessed by the instructions. Initially the LSRT ID 904, PA offset 906 and hazard checking fields 908 are not completed. The FIFO 812 is managed as a circular buffer with an allocation pointer tracking the next entry to be allocated with a new delegable instruction and being incremented to point to the following entry each time a new delegable instruction is allocated to the queue (with the pointer circling back to the start of the buffer when incremented after reaching the end of the buffer). State associated with the instructions in the buffer may also track which instructions have committed (e.g. by using "commit" flags associated with each entry indicating whether or not that instruction has been committed, or by using a commit pointer marking the entry at the boundary between committed and still-to-be-committed instructions (such a commit pointer would be ahead of (point to an entry corresponding to a younger instruction than) the runahead pointer 818 used to track the next entry to undergo LSRT ID conversion). As explained above, the hazarding vectors 819, 820 may be updated based on any changes to state in the FIFO 812.

Regardless of whether the instruction is delegable or non-delegable, at step 1008, it is determined whether the instruction is a load/store instruction. If not, then the instruction does not need to be dispatched to the translation logic 800 of the load/store unit 14 (step 1010). If the instruction is a load/store instruction, then at step 1012 instruction is dispatched the translation logic 800, which performs address translation based on address mappings defined in page tables, to translate the virtual address of the load/store instruction into a physical address. The address translation process may take some time, depending on whether the translation can be serviced based on cached address mapping information stored in translation lookaside buffer (TLB) or requires a page table walk to obtain page table information from page table structures stored in memory. At step 1014, the address translation circuitry 800 waits for the address translation to be resolved. Upon resolution of the address translation, at step 1016 the load/store instruction is allocated into the load/store queues 802 of the load/store unit, and at step 1018 if the load/store is a non-delegable load instruction, upon return of loaded data obtained from a cache or memory for the load instruction, non-delegable hazard tracking structures are updated to track the load (e.g. a RAR buffer is updated). In general, tracking and hazard checking for non-delegable load/store operations may be performed according to any known technique.

Figure 11:
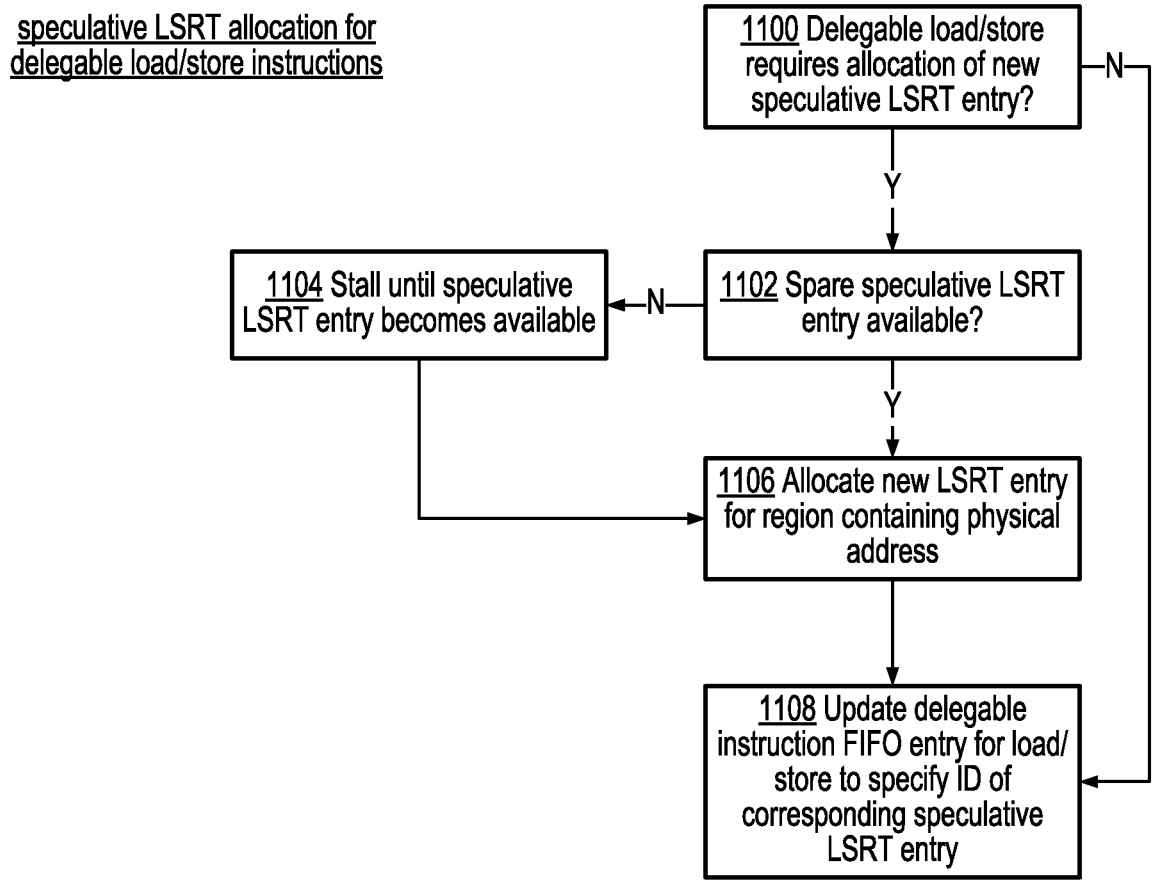
FIG. 11 illustrates speculative region table allocation for delegable load/store instructions.

FIG. 11 illustrates allocation of an entry in the speculative LSRT 830 (delegable memory access tracking structure) for a delegable load/store instruction that has resolved its address translation (hence the physical address of the load/store instruction is already available). At step 1100, the tracking circuitry 18 determines, based on comparison with existing speculative LSRT entries to determine whether an entry already corresponds to the address/attributes of the delegable load/store operation, whether the delegable load/store operation requires allocation of a new speculative LSRT entry. This determination depends at least on whether a portion of the physical address (excluding least significant bits of the physical address which distinguish different addresses in the same region, e.g. excluding the lower 12 bits for a 4 KB region size) corresponds to the region PA 910 for any existing valid entry in the speculative LSRT 830. However, the determination could also depend on other comparisons.

For example, in some examples supporting use of multiple physical address spaces to enable program code and data in one physical address space to be isolated from access by program code associated with another physical address space, the attributes 912 could specify a physical address space identifier, and so correspondence between the address of a given delegable memory access and an existing entry of the speculative LSRT 830 could also depend on a comparison of a physical address space ID associated with the given delegable memory access and a physical address space ID stored in the existing entry. Even if there is an existing entry for the same address in a different physical address space, a new entry may be allocated for that address in the physical address space associated with the given delegable memory access.

Also, in some examples, although each speculative LSRT entry corresponds to a given physically addressed memory region, to speed up determination of whether a new speculative LSRT entry should be allocated, each speculative LSRT entry could specify a virtual region address corresponding to the physical region address and a context identifier identifying the address translation context associated with the entry, and the detection of whether the current delegable load/store access corresponds to an existing entry could be based on comparing the virtual address of the current delegable load/store access with the virtual addresses specified in each valid speculative LSRT entry, and comparing a current context with the stored context identifier, to detect an entry as corresponding to the access if both the virtual address comparison and context comparison detect a match. Alternatively, rather than storing the context identifier in each speculative LSRT entry, on a context switch the affected entries in the LSRT may be marked as stale to prevent incorrect LSRT assignment for instructions in the new context, to ensure that all valid in-use entries in the speculative LSRT relate to the current context. Either way, performing the detection of whether the current delegable access corresponds to an existing valid entry based on a virtual address comparison, rather than a physical address comparison, can help speed up performance by allowing the detection of the corresponding speculative LSRT entry (if any) to be performed at least partially in parallel with the address translation process obtaining the physical address.

If the delegable load/store operation requires allocation of a new speculative LSRT entry, because there is no valid entry already in the LSRT 830 for the region/attributes corresponding to the delegable load/store instruction, then at step 1102 it is determined whether the speculative LSRT 830 includes a spare invalid entry which is available for reallocation. If there is no such spare entry available, at step 1104 the pipeline is stalled until such an entry becomes available (e.g. when another entry is promoted to the main LSRT 840 when another delegable load/store operation undergoes LSRT ID conversion). Once a spare speculative LSRT entry is available, then at step 1106 a new speculative LSRT entry is allocated to the speculative LSRT 830 specifying in field 910 the region address of the physical address region accessed by the delegable load/store instruction and specifying in field 912 the region's attributes (e.g. physical address space ID, memory type, shareability attributes) as determined in the translation lookup. The allocation scheme used for the speculative LSRT may limit allocation so that one or more entries are reserved for the oldest remaining delegable load/store operation even if the oldest remaining delegable load/store operation has not yet reached the stage at which it can allocate a speculative LSRT entry (e.g. there is at least one entry which can only be allocated for the oldest remaining operation). This avoids deadlocks which could otherwise arise if the oldest operation cannot allocate into the speculative LSRT due to insufficient capacity in the speculative LSRT but younger operations are blocked from leaving the speculative LSRT due to not being committed due to the lack of progress of the oldest operation, and so ensures forward progress can be made.

Regardless of whether the physical address of the delegable load/store instruction matched against an existing entry, or a new entry was allocated to the speculative LSRT 830 for the region accessed by the delegable load/store instruction, at step 1108 the entry of the delegable instruction queue 812 corresponding to the delegable load/store instruction is updated to specify (in field 904) the identifier of the speculative LSRT entry corresponding to the region accessed by the delegable load/store instruction (i.e. either the identifier of the new entry allocated at step 1106 or the identifier of the existing entry detected as corresponding to the physical address/attributes of the access at step 1100). Hence, the speculative LSRT entry ID in field 904 can act as a proxy for the physical address. Again, any updates to the instruction queue 812 may cause corresponding changes to be made to the load/store hazarding vectors 819, 820 (e.g. hazard checks being passed for a load/store may cause the corresponding bit in the corresponding hazarding vector 819 or 820 to be set, and ID conversion for a load/store may cause a bit in the corresponding hazarding vector 819, 820 to clear).

Figure 12:
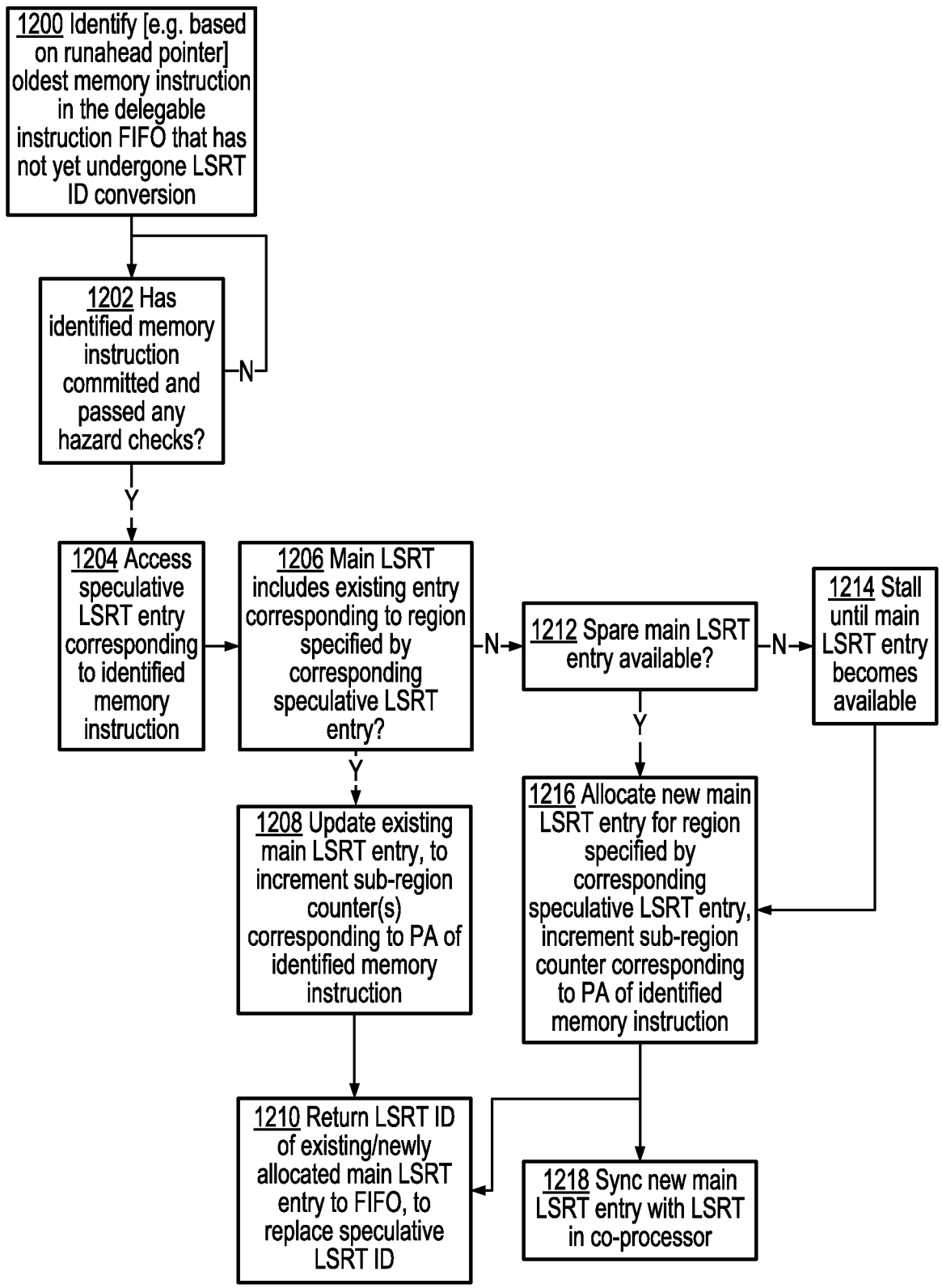
FIG. 12 illustrates a region table entry identifier swap process.

FIG. 12 illustrates a process for LSRT ID conversion performed by LSRT ID conversion circuitry 844 for a delegable memory access instruction pending in the delegable instruction queue 812. For a series of instructions including delegable memory access instructions, the LSRT ID conversion process is performed in program order for the respective delegable memory access instructions, so that the LSRT ID conversion process for younger delegable memory access instruction cannot take place until the LSRT ID conversion process has been performed for an older delegable memory access instruction (this helps avoid deadlock situations which could otherwise arise if out of order LSRT ID conversion was possible). The instructions are subsequently dispatched to the coprocessor 20 in program order.

Hence, at step 1200, the LSRT ID conversion circuitry 844 identifies the oldest memory instruction in the delegable instruction queue 812 that has not yet undergone LSRT ID conversion (this instruction is referred to as the "identified" instruction below). Although the oldest memory instruction not having undergone LSRT ID conversion can be identified a number of ways, it can be efficient to use a runahead pointer 818 to track the next instruction to undergo LSRT ID conversion. Hence, in some cases, the oldest instruction requiring LSRT ID conversion could be identified as being the instruction in the entry of the queue 812 pointed to by the runahead pointer 818. In an embodiment using the runahead pointer 818, the runahead pointer 818 is advanced to indicate the next entry of the queue 812 that correspond to a memory access instruction once the LSRT ID conversion has been performed for the entry currently pointed to by the runahead pointer 818. For example, the next entry that corresponds to a memory access instruction can be identified from the load/store instruction vectors 819, 820—on completing the LSRT ID conversion for one instruction, the runahead pointer 818 may be advanced to point to the next entry that has a "1" set in one of the load instruction vector 819 and store instruction vector 820 (skipping over any intervening entries of the queue 812 that correspond to "0s" in both vectors 819, 820 and so are determined to relate to non-memory instructions). Although not essential, this use of the runahead pointer 818 and load/store instruction vectors 819, 820 can simplify identification of the next instruction to undergo LSRT ID conversion, by avoiding the need to decode instruction type information in each entry of queue 812.

At step 1202, the LSRT ID conversion circuitry 844 checks whether the identified instruction has been committed and has already passed any required hazard checks. The commit status of the identified instruction could be determined in different ways, for example, based on any of: information in a reorder buffer or instruction queue; a commit pointer associated with the delegable instruction queue 812 indicating the entry corresponding to the oldest uncommitted instruction; or a commit flag associated with the entry of queue 812 corresponding to the identified instruction, which indicates whether the instruction has committed. Whether an instruction has passed its hazard checks could be determined based on checking a hazard flag 908 in the corresponding entry of queue 812, or could be implicit from the fact that the instruction is ready to commit.

Once the identified instruction (the oldest remaining delegable memory instruction in queue 812 that has not yet undergone LSRT ID conversion) has been determined as having committed and passed its hazard checks, then LSRT ID conversion can proceed for the identified instruction. At step 1204, LSRT ID conversion circuitry 844 accesses the entry of the speculative LSRT 830 indicated by the identifier in field 904 of the delegable instruction queue entry corresponding to the identified instruction. At step 1206, it is determined whether the main LSRT 840 includes an existing entry corresponding to the same physical address region specified by the speculative LSRT entry accessed at step 1204 for the identified instruction. If so, then at step 1208 that existing main LSRT entry is updated, to increment a corresponding access counter 924 corresponding to the physical address to be accessed for the identified memory instruction. If the main LSRT entry comprises two or more sub-region counters 924 as shown in FIG. 9, selection of the access counter 924 to update depends on the PA offset bits 906 of the delegable instruction queue entry for the identified instruction (and on the size of the block of data accessed by the memory access instruction—e.g. an instruction could cross a sub-region boundary and so how many sub-regions are accessed by the instruction can depend on the size of the data access not just its start address). At step 1210, the LSRT ID of the existing main LSRT entry updated at step 1208 is returned to the delegable instruction FIFO and replaces the previously indicated speculative LSRT ID in field 904.

If at step 1206 it is determined that the main LSRT 840 did not include any existing entry corresponding to the region specified by the speculative LSRT entry corresponding to the identified instruction, then at step 1212 it is determined whether any spare main entry is available in the 840, and if not processing is stalled at step 1214 until a main LSRT entry becomes available (an LSRT entry may become available once its access counters 924 indicate that there are no longer any outstanding memory accesses pending which have not yet been completed by the coprocessor 20). Unlike the speculative LSRT, there is no need to reserve a slot in the main LSRT for the oldest remaining delegable load/store operation, because LSRT ID conversion (and hence main LSRT allocation) is done in strict program order and so the operation attempting to allocate into the LSRT is by definition the oldest remaining operation. Once a spare main LSRT entry becomes available, then at step 1216 a new main LSRT entry is allocated for the physical address region specified by the corresponding speculative LSRT entry accessed at step 1204 (e.g. the region PA 920 and attributes 922 fields of the new main LSRT entry are set based on the information stored in the corresponding region PA 910 and region attributes 912 fields of the corresponding speculative LSRT entry), and the corresponding access counter 924 corresponding to the physical address accessed by the identified memory instruction is incremented (again, the counter 924 to update can be selected based on the PA offset bits 906 and access size of the identified memory instruction's FIFO entry in embodiments where there are multiple sub-region counters 924 in the same main LSRT entry). At step 1210, the LSRT ID of the newly allocated main LSRT entry is returned to the FIFO to replace the previously indicated speculative LSRT ID in field 904 of the FIFO entry corresponding to the identified instruction. Hence, the LSRT ID conversion is complete and the runahead pointer 818 can be updated as mentioned above to point to the next oldest FIFO entry that relates to a memory access instruction.

Also, in the case where a new main LSRT entry is allocated at step 1216 (but not when an existing entry is updated at step 1208), then at step 1218 the new main LSRT entry is synchronised with a corresponding entry of the coprocessor LSRT 842, so that when packets are sent via interface 816 referencing a given LSRT entry, the information in the coprocessor's version of the LSRT corresponds to the information set for the given LSRT entry in the main LSRT 840 on the CPU side. Hence, at least the region PA 920 and region attributes 922 of the newly allocated main LSRT entry are forwarded to the coprocessor's LSRT 842 in the synchronisation information (in some examples other information about the region could also be stored in the LSRT and included in the synchronisation). The access counters 924 do not need to be shared with the coprocessor 20. As synchronisation is performed only for the new entries allocated to the LSRT, which is dependent on a corresponding instruction being guaranteed to commit, in this embodiment there is no need for any speculative updates to the coprocessor's LSRT 842, which reduces the bandwidth required for the synchronisation operation.

Figure 13:
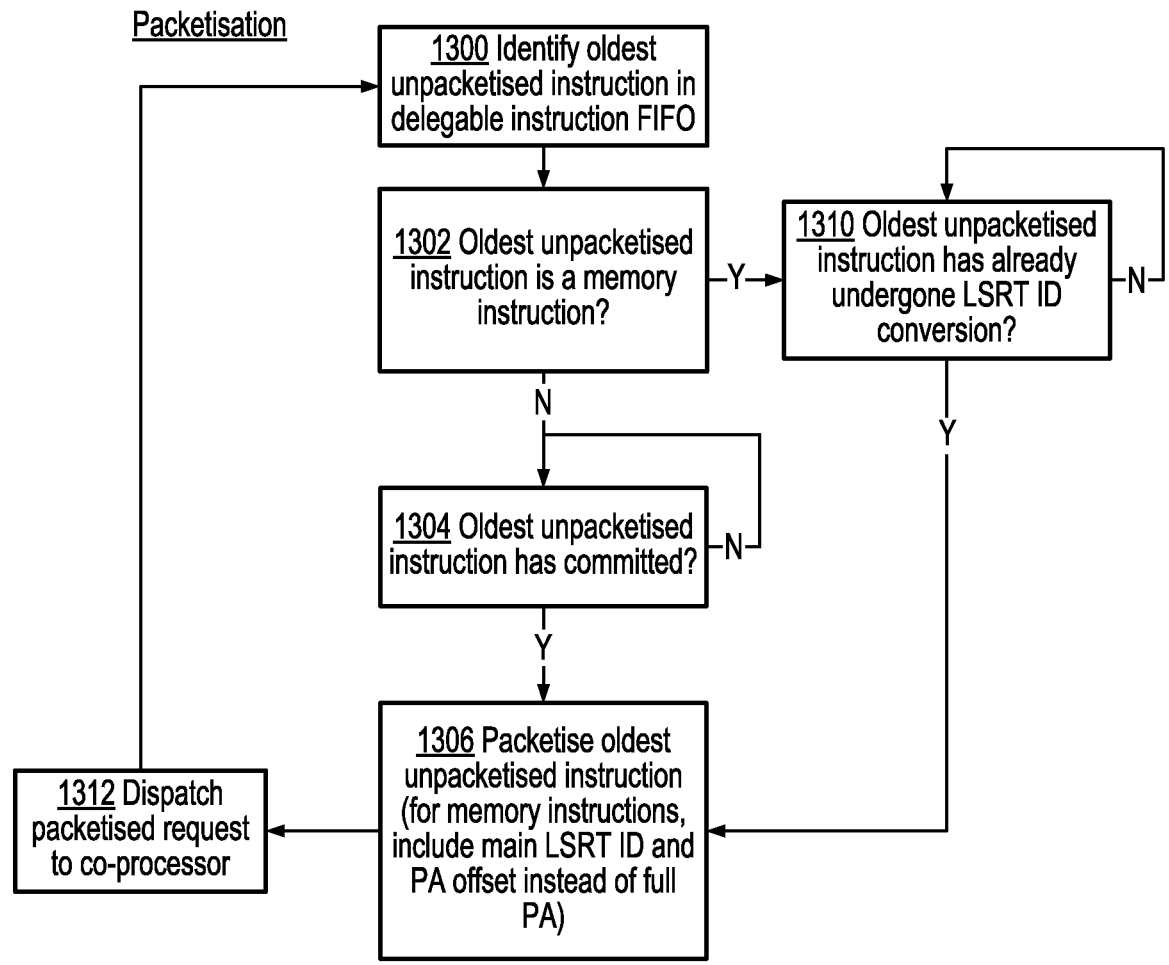
FIG. 13 illustrates packetisation of a delegable instruction to form a request to be sent to a coprocessor.

FIG. 13 illustrates packetisation by packetiser 814, to form the request packets sent over the interface 816 to the coprocessor 20 to represent the series of delegable instructions to be executed by the coprocessor 20. Based on the packets generated by the packetiser 814, the delegable instructions are queued on the coprocessor side for execution by the execute logic 22.

At step 1300, the packetiser 814 identifies the oldest unpacketised instruction in the delegable instruction queue 812. For example, the packetiser 814 may maintain a pointer which identifies the oldest unpacketised instruction, which may be advanced to point to the next entry (and if necessary wrap back to the start of the buffer when advanced from the last entry) each time an instruction is packetised. Hence, the oldest unpacketised instruction in the delegable instruction queue 812 can be identified based on the packetiser-maintained pointer.

At step 1302, the packetiser 814 identifies whether the oldest unpacketised instruction is a memory access instruction. For example, this can be determined by checking the entries of the load/store vectors 819, 820 corresponding to the entry of the FIFO 812 corresponding to the oldest unpacketised instruction.

If the oldest unpacketised instruction is not a memory access instruction (e.g. a computation instruction for performing a computation operation such as an arithmetic/logical operation), then at step 1304 the packetiser 814 determines whether the oldest unpacketised instruction has been committed. If not, the packetiser 814 waits for that oldest unpacketised instruction to have committed.

If the oldest unpacketised instruction is a memory access instruction, then at step 1310 the packetiser 814 determines whether the oldest unpacketised instruction has already undergone LSRT ID conversion (as per the process shown in FIG. 12). As that ID conversion process includes a check of whether the identified memory instruction has committed, there is no need for separately checking for the instruction being committed, and so step 1304 can be skipped for memory instructions. If the oldest unpacketised instruction is a memory access instruction (load/store) and has not already undergone LSRT ID conversion then the packetiser 814 waits for that oldest unpacketised instruction to undergo LSRT ID conversion.

Once the oldest unpacketised instruction is committed (Y at step 1304) or has undergone LSRT ID conversion (Y at step 1310), then at step 1306 the packetiser 814 packetizes the oldest unpacketised instruction to generate a packetised request which is dispatched to the coprocessor at step 1312. The packetised request comprises information identifying the instruction to be processed by the coprocessor 20, e.g. the opcode 900, any register identifiers 902 identifying register operands or other registers to be accessed for the instruction, and if necessary any immediate operands used by the instruction. For memory access instructions, the packetised request comprises the main LSRT ID 904 and PA offset 906 indicated by the delegable instruction FIFO entry corresponding to the oldest unpacketised instruction, instead of indicating the full physical address and attributes to be accessed by the load/store operation represented by that instruction. This reduces the number of bits to be transferred to the coprocessor 20 compared to transmitting the full physical address. The coprocessor 20 can subsequently use its copy of the LSRT 842 to map the LSRT ID 904 to a physical region address and attributes that was previously synchronised with the main LSRT 840.

Figure 14:
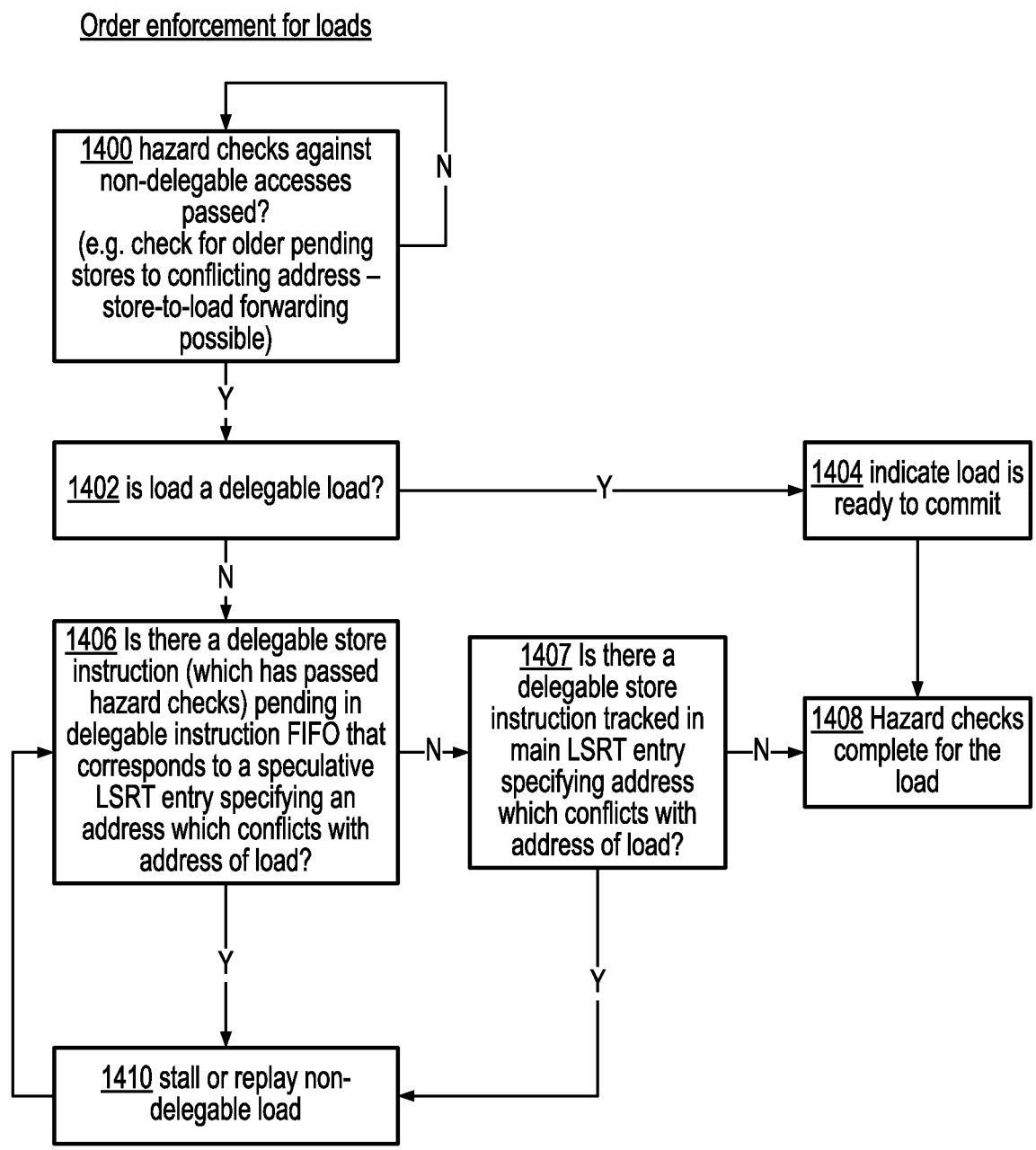
FIG. 14 illustrates order enforcement for load operations.
Figure 15:
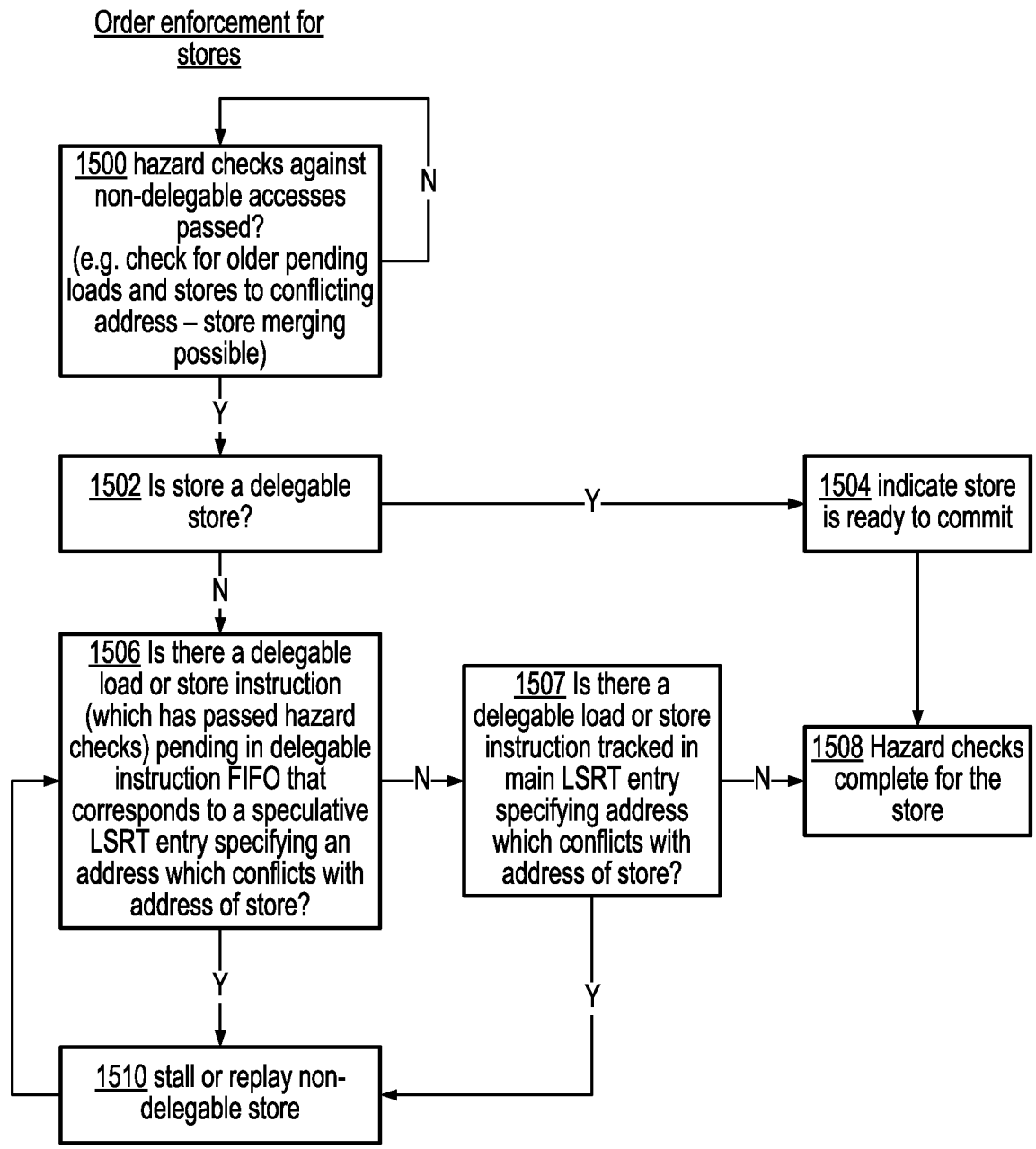
FIG. 15 illustrates order enforcement for store operations.

FIGS. 14 and 15 illustrate order enforcement (hazard checking) by the order enforcement circuitry 19. Hazarding between two respective non-delegable memory accesses can be performed according to any known technique (e.g. based on a RAR buffer structure for detecting impermissible reordering of reads that violate any architectural ordering requirements such as a barrier, and/or a store buffer structure for detecting write-after-write hazards which could be resolved by merging respective writes to the same address or detecting opportunities for store-to-load forwarding). Hazarding between two respective delegable memory accesses is not necessary on the CPU side, because the accesses are dispatched to the coprocessor in program order and subsequently the responsibility for correct ordering passes to the coprocessor 20 (which could either execute the accesses strictly in program order, or may have its own internal order enforcement logic for checking for hazards between out-of-order executed delegable accesses but which does not need to check for ordering of the delegable accesses relative to non-delegable accesses).

However, as delegable memory accesses are able to leave the load/store unit 14 speculatively to free up slots for non-delegable memory accesses and thereafter may remain pending for a considerable time before being completed by the coprocessor, there is a risk that a non-delegable memory access could bypass an older delegable memory access and violate ordering requirements. Therefore, non-delegable memory accesses are hazarded by the order enforcement circuitry 19 against the speculative LSRT 830 and main LSRT 840 (with reference to the delegable instruction FIFO 812) to check for ordering violations.

FIG. 14 illustrates order enforcement for a given load operation. At step 1400, the order enforcement circuitry 19 determines whether any hazard checks against any other pending non-delegable accesses have been passed. For example, the order enforcement circuitry 19 can check for older pending stores to a conflicting address. If an older pending non-delegable store is detected, store-to-load forwarding can be used to forward the value to be written to the memory system by the older pending store for use as part of the value to be loaded by a younger non-delegable load operation. If an older store is pending and the younger load is of the opposite type (delegable/non-delegable) to the older store, then store-to-load-forwarding is not possible and instead the younger load may be stalled until the older store is complete or may bypass any older unresolved stores and use a read-after-write check to detect if an older store conflicts so that the load can be replayed if necessary. Such hazard checks against non-delegable accesses can be performed according to any known technique.

At step 1402, it is determined whether the given load being hazarded is a delegable load. If so, there is no need to hazard the delegable load against other delegable load/stores on the CPU side. However, since completion of hazarding checks is a requirement for being able to undergo LSRT ID conversion in FIG. 12, the order enforcement circuitry 19 may (in some examples) signal an indication that load is ready to commit. This could be done as part of the process for signalling that translation for the load has resolved (either individually for this load, or in a batch for a group of load micro-operations). Another way of implementing this could be to provide a signal, separate from translation resolution, which indicates to the delegable instruction FIFO that the hazard checks for the given load have passed, so that the delegable instruction FIFO can set the hazard check complete flag 908 and use that flag to determine whether LSRT ID conversion can be performed for that load. At step 1408, hazard checks are then determined to be complete for the given (delegable) load.

On the other hand, if the given load is a non-delegable load, then at steps 1406 and 1407 some further checks are carried out against delegable store instructions tracked using the delegable instruction FIFO 812, speculative LSRT 830 and main LSRT 840. At step 1406 the order enforcement circuitry 19 checks whether there is a delegable store instruction (which has passed its hazard checks) pending in the delegable instruction FIFO 812 that corresponds to a speculative LSRT entry specifying an address which conflicts with the address of the given (non-delegable) load operation. Hence, non-delegable loads hazard against older delegable stores, not older delegable loads—the store instruction vector 820 can be used to identify the older delegable stores in the delegable instruction FIFO 812. The address hazarding is imprecise, due to the region-level granularity of tracking of accesses in the speculative LSRT 830, which mean two operations could be detected as hazarding even if they do not access the same address—this imprecision is a trade-off between hazarding accuracy and storage/maintenance overhead of maintaining the speculative LSRTs 830. Hence, an address of the given non-delegable load operation is regarded as conflicting with the address of an older delegable store instruction if there is a risk that the two operations could access the same address (e.g. if the addresses are in the same region or sub-region), so conflict does not necessarily require accesses to relate to the same address. Whether a delegable store instruction tracked in the delegable instruction FIFO 812 has passed its hazard checks could either be implicit (in an implementation where the delegable store instruction would be delayed in signalling its readiness to commit until the hazard checks are passed), or could be determined based on a hazard check complete flag 908 in the corresponding FIFO entry (in an implementation which allows signalling that an instruction can be ready to commit even before the hazard checks are passed).

In some examples, the determination at step 1406 can be based on:
  a lookup of the address of the given non-delegable load in each valid entry of the speculative LSRT 830, to detect a speculative LSRT hit if there is a valid speculative LSRT entry specifying a physical region address corresponding to the address of the given non-delegable load;
  qualification of the result of the speculative LSRT lookup using the store hazarding vector 820, to exclude from consideration any hit in the speculative LSRT 830 which does not relate to a pending store in the FIFO 812 that has already passed its hazarding checks. Hence, even if the given non-delegable load corresponds to a region tracked in a given speculative LSRT entry, that hit is ignored if the store hazarding vector 820 indicates that the given speculative LSRT entry is not referenced by any valid entry in the FIFO 812 that relates to a store operation that has passed its hazard checks.

Hence, in summary the order enforcement circuitry 19 detects whether the speculative LSRT 830 (delegable memory access tracking structure) includes any conflicting entry corresponding to the address information of the given non-delegable memory access, and determines (based on the store hazarding vector 820) whether the delegable instruction queue 812 includes a valid entry for a conflicting delegable store with hazard checks complete for which the field 904 specifies the identifier of the conflicting speculative LSRT entry.

At step 1407, a further hazard check is carried out using the main LSRT. Although step 1407 is shown as sequentially following step 1406 in FIG. 14 for ease of explanation, steps 1406 and 1407 could be performed in parallel or in the opposite order. At step 1407, the order enforcement circuitry determines whether the main LSRT 840 specifies that there is a delegable store instruction tracked in a main LSRT entry specifying an address which conflicts with the address of the given non-delegable load. For example, this could be based on information specified in the main LSRT entries indicating whether there are any outstanding stores to the corresponding address region (e.g. based on whether the any of the set of store sub-region counters corresponding to an address of the given non-delegable load are non-zero in a valid main LSRT entry for which the region address (and attributes) corresponds to the address (and attributes) of the given non-delegable load). Again, given the sub-region granularity of identifying addresses of outstanding delegable store operations, it is possible that there could be false positive hazards detected where the load hazards against a delegable store even if the load would actually have accessed a different address in the same sub-region as the delegable store.

If neither step 1406 nor step 1407 identifies such a conflicting delegable store instruction, then at step 1408 the hazard checks are determined to be complete for the load.

If at step 1406 a delegable store instruction is identified in the FIFO 812 which has passed its hazard checks and corresponds to a speculative LSRT entry conflicting with the address of the given load, or at step 1407 a delegable store instruction is identified as outstanding by a main LSRT entry corresponding to the address (and attributes) of the given load, then at step 1410 the given non-delegable load is either stalled or replayed (the given non-delegable load may retry hazard checks later, and can proceed after the conflicting delegable store is complete).

FIG. 15 shows order enforcement for a given store operation. At step 1500, the order enforcement circuitry 19 determines whether any hazard checks against any other pending non-delegable accesses have been passed. For stores, these checks could include checks for both older pending loads and stores to conflicting addresses. If there is a conflict between two non-delegable stores, store merging can be used to merge the store data for the two stores before the store data is written to memory. Any known technique can be used for store hazarding of non-delegable accesses against other non-delegable accesses.

At step 1502 it is determined whether the given store operation is a delegable store, and if so, then at step 1504, it is determined that the store is ready to commit. As at step 1404, this can be done either as part of the process of signalling resolution of the translation, or using a separate signal indicating hazard checks are complete.

If the store is a non-delegable store, then at step 1506, the order enforcement circuitry 19 checks whether there is a delegable load or store instruction (which has passed its hazard checks) pending in the delegable instruction FIFO 812 that corresponds to a speculative LSRT entry specifying an address which conflicts with the address of the given non-delegable store operation. This is similar to step 1406, except that for hazard checks performed for non-delegable stores, the store can hazard against both older loads and older stores, so the lookup to the speculative LSRT 830 is qualified by the OR combination of the load and store instruction vectors 819, 820, not merely the store instruction vector 820 as for hazarding at step 1406 for loads. Otherwise, the hazarding is similar to step 1406. Also, at step 1507, the order enforcement circuitry 19 checks whether the main LSRT 840 includes a valid main LSRT entry tracking either a delegable load instruction or delegable store instruction specifying an address conflicting with the address of the store. If neither of steps 1506 and 1507 detects a conflicting delegable load/store based on the lookups of the speculative LSRT 830 and main LSRT 840, then at step 1508 the hazard checks can be regarded as complete for the given store instruction. If a conflicting delegable load/store instruction is identified at step 1506 or step 1507, then at step 1510 the non-delegable store is either stalled or replayed, until the conflicting delegable load/store instruction has completed.

For all the flow charts described above, it will be appreciated that the flow charts show one example of a possible sequence of steps. Other examples may reorder some steps while obtaining the same result, or could perform some steps in parallel.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 16:
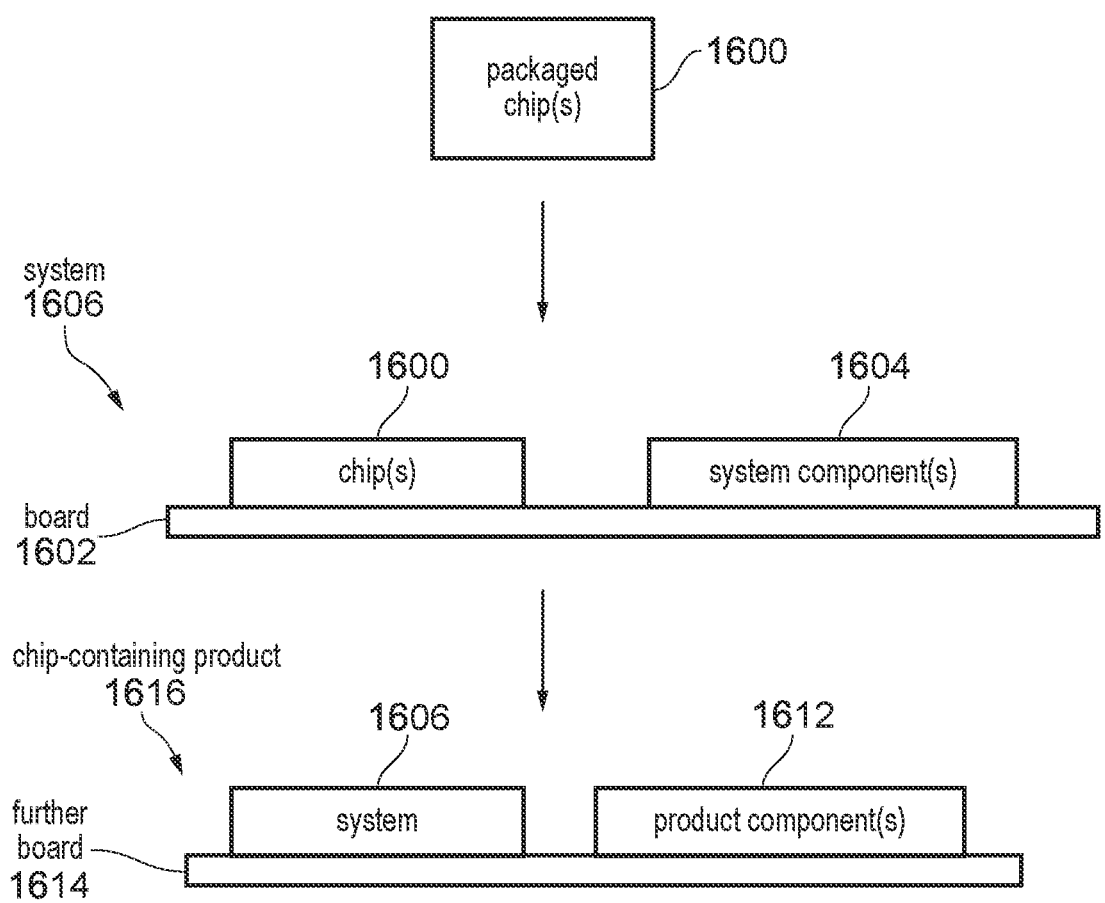
FIG. 16 illustrates a system and a chip-containing product.

As shown in FIG. 16, one or more packaged chips 1600, with the apparatus described above implemented on one chip or distributed over two or more of the chips, are manufactured by a semiconductor chip manufacturer. In some examples, the chip product 1616 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1600 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers). Chiplets may be used to implement one or more of the components shown in the data processing system 1 in FIG. 1. For example, the CPU 10 may be implemented on one chiplet, whereas the CME unit (coprocessor) 20 may be implemented on a different chiplet. Alternatively, they may both be contained on the same chiplet or made up of multiple chiplets.

The one or more packaged chips 1600 are assembled on a board 1602 together with at least one system component 1604 to provide a system 1606. For example, the board may comprise a printed circuit board. The board substrate may be made of any of a variety of materials, e.g. plastic, glass, ceramic, or a flexible substrate material such as paper, plastic or textile material. The at least one system component 1604 comprise one or more external components which are not part of the one or more packaged chip(s) 1600. For example, the at least one system component 1604 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1616 is manufactured comprising the system 1606 (including the board 1602, the one or more chips 1600 and the at least one system component 1604) and one or more product components 1612. The product components 1612 comprise one or more further components which are not part of the system 1606. As a non-exhaustive list of examples, the one or more product components 1612 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1606 and one or more product components 1612 may be assembled on to a further board 1614.

The board 1602 or the further board 1614 may be provided on or within a device housing or other structural support (e.g. a frame or blade) to provide a product which can be handled by a user and/or is intended for operational use by a person or company.

The system 1606 or the chip-containing product 1616 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some examples are set out in the following clauses:

(1) An apparatus comprising:
memory access circuitry configured to perform memory accesses in response to a stream of memory access instructions;
offloading circuitry configured to:
identify, in the stream of memory access instructions, a delegable memory access instruction specifying a delegable memory access to be performed to a target address by an external processing apparatus instead of the delegable memory access being performed by the memory access circuitry; and
in response to the delegable memory access instruction being committed, to send a request to the external processing apparatus to request that the external processing apparatus performs the delegable memory access specified by the delegable memory access instruction;
tracking circuitry to maintain tracking information representing the target address of the delegable memory access in a delegable memory access tracking structure separate from a tracking structure used to track non-delegable memory accesses to be performed by the memory access circuitry; and
order enforcement circuitry configured to enforce an ordering requirement between a given non-delegable memory access and the delegable memory access based on a lookup of address information associated with the given non-delegable memory access in the delegable memory access tracking structure.

(2) The apparatus of clause (1), wherein
the order enforcement circuitry is configured to detect an ordering hazard between the given non-delegable memory access and the delegable memory access in response to detecting that:
the tracking information representing the target address of the delegable memory access corresponds to the address information associated with the given non-delegable memory access, and
the given non-delegable memory access is associated with an instruction that is later in program order than the delegable memory access instruction.

(3) The apparatus of clause (1) or clause (2), wherein
in response to detecting, based on the lookup of the address information, an ordering hazard between the given non-delegable memory access and the delegable memory access, the order enforcement circuitry is configured to prevent the memory access circuitry from performing the given non-delegable memory access.

(4) The apparatus of clause (3), wherein
the order enforcement circuitry is configured to stop preventing the memory access circuitry from performing the given non-delegable memory access in response to a completion notification indicating that the external processing apparatus has completed the delegable memory access.

(5) The apparatus of any preceding clause, wherein
in response to detecting, based on the lookup of the address information, no ordering hazard between the given non-delegable memory access and the delegable memory access, the order enforcement circuitry is configured to permit the memory access circuitry to perform the given non-delegable memory access.

(6) The apparatus of any preceding clause, wherein
in absence of detection of an ordering hazard between the given non-delegable memory access and the delegable memory access, the memory access circuitry is configured to speculatively execute the given non-delegable memory access before the delegable memory access is committed.

(7) The apparatus of any preceding clause, wherein
the ordering requirement is based on at least a program order of the given non-delegable memory access and the delegable memory access.

(8) The apparatus of any preceding clause, wherein
the tracking circuitry is configured to maintain a plurality of entries of the delegable memory access tracking structure, such that the plurality of entries are representative of a program order of a plurality of delegable memory accesses including the delegable memory access.

(9) The apparatus of any preceding clause, wherein
the tracking information comprises a memory region identifier indicative of a region of memory addresses including the target address.

(10) The apparatus of clause (9), wherein
the tracking circuitry is configured to maintain a region table to store at least a portion of a physical region address defining the region of memory addresses; and
the memory region identifier comprises an index at which the portion of the physical region address is stored in the region table.

(11) The apparatus of clause (10), wherein
the tracking circuitry is configured to maintain the region table to store at least one counter indicative of a number of uncompleted delegable memory accesses to the region of memory addresses that have been requested by the offloading circuitry but not yet indicated as completed by the external processing apparatus.

(12) The apparatus of clause (11), wherein
the tracking circuitry is configured to maintain the region table to store a plurality of sub-region counters each indicative of a number of uncompleted delegable memory accesses to a corresponding sub-region of memory addresses within the region of memory addresses.

(13) The apparatus of any of clauses (10) to (12), wherein
the tracking circuitry is configured to perform a synchronisation between the region table with a corresponding region table in the external processing apparatus.

(14) The apparatus of clause (13), wherein
the tracking circuitry is configured to perform the synchronisation when the delegable memory access is committed.

(15) The apparatus of any of clauses (9) to (14), wherein
the offloading circuitry is configured to include, in the request to the external processing apparatus, the memory region identifier instead of the target address.

(16) The apparatus of any preceding clause, wherein
the offloading circuitry is configured to identify an instruction of at least one class of single-instruction-multiple-data memory access instruction as the delegable memory access instruction.

(17) The apparatus of any preceding clause, wherein
the offloading circuitry is configured to identify, as the delegable memory access instruction, an instruction of said at least one class of single-instruction-multiple-data memory access instruction which is executed in a predetermined mode of processing.

(18) The apparatus of clause (16) or clause (17), wherein
the single-instruction-multiple-data instruction is a scalable vector/matrix instruction, wherein
in response to the scalable vector/matrix instruction, the external processor is caused to perform a sequence of one or more operations on each element in a vector/matrix; and
a size of the vector/matrix is defined by at least one parameter stored in a register.

(19) A system comprising:
the apparatus of any of clauses (1) to (18), implemented in at least one packaged chip;
at least one system component; and
a board,
wherein the at least one packaged chip and the at least one system component are assembled on the board.

(20) A chip-containing product comprising the system of claim (19), assembled on a further board with at least one other product component.

(21) A method comprising:
performing, with memory access circuitry, memory accesses in response to a stream of memory access instructions;
identifying, in the stream of memory access instructions, a delegable memory access instruction specifying a delegable memory access to be performed to a target address by an external processing apparatus instead of the delegable memory access being performed by the memory access circuitry and, in response to the delegable memory access instruction being committed, sending a request to the external processing apparatus to request that the external processing apparatus performs the delegable memory access specified by the delegable memory access instruction;
maintaining tracking information representing the target address of the delegable memory access in a delegable memory access tracking structure separate from a tracking structure used to track non-delegable memory access to be performed by the memory access circuitry; and
enforcing an ordering requirement between a given non-delegable memory access and the delegable memory access based on a lookup of address information associated with the given non-delegable memory access in the delegable memory access tracking structure.

(22) A non-transitory computer-readable medium to store computer-readable code for fabrication of an apparatus comprising:
memory access circuitry configured to perform memory accesses in response to a stream of memory access instructions;
offloading circuitry configured to:
identify, in the stream of memory access instructions, a delegable memory access instruction specifying a delegable memory access to be performed to a target address by an external processing apparatus instead of the delegable memory access being performed by the memory access circuitry; and
in response to the delegable memory access instruction being committed, to send a request to the external processing apparatus to request that the external processing apparatus performs the delegable memory access specified by the delegable memory access instruction;
tracking circuitry to maintain tracking information representing the target address of the delegable memory access in a delegable memory access tracking structure separate from a tracking structure used to track non-delegable memory accesses to be performed by the memory access circuitry; and
order enforcement circuitry configured to enforce an ordering requirement between a given non-delegable memory access and the delegable memory access based on a lookup of address information associated with the given non-delegable memory access in the delegable memory access tracking structure.

(23). An apparatus comprising:
memory access circuitry configured to perform memory accesses in response to memory access instructions among a series of instructions to be executed;
offloading circuitry configured to:
identify, in the series of instructions, a delegable memory access instruction specifying a delegable memory access to be performed to a target address by an external processing apparatus instead of the delegable memory access being performed by the memory access circuitry; and
dependent on the delegable memory access instruction being committed, to send a request to the external processing apparatus to request that the external processing apparatus performs the delegable memory access specified by the delegable memory access instruction;
tracking circuitry to maintain tracking information representing the target address of the delegable memory access in a delegable memory access tracking structure separate from a tracking structure used to track non-delegable memory accesses to be performed by the memory access circuitry; and
order enforcement circuitry configured to enforce an ordering requirement between a given non-delegable memory access and the delegable memory access based on a lookup of address information associated with the given non-delegable memory access in the delegable memory access tracking structure.

(24). The apparatus according to clause (23), wherein the tracking circuitry is configured to allocate tracking information representing target addresses of one or more still-to-be-committed delegable memory accesses to the delegable memory access tracking structure.

(25). The apparatus according to any of clauses (23) and (24), wherein
in absence of an intervening non-delegable store memory access between the delegable memory access and the given non-delegable memory access removing a need for hazarding between the delegable memory access and the given non-delegable memory access, the order enforcement circuitry is configured to detect an ordering hazard between the given non-delegable memory access and the delegable memory access in response to detecting at least that:
the address information associated with the given non-delegable memory access corresponds to tracking information tracked in the delegable memory access tracking structure for the delegable memory access; and
the given non-delegable memory access is associated with an instruction that is later in program order than the delegable memory access instruction.

(26). The apparatus according to clause (25), comprising a delegable instruction queue to track delegable instructions awaiting processing by the external processing apparatus, wherein each entry in the delegable instruction queue has a field for specifying an identifier of an associated entry in the delegable memory access tracking structure.

(27). The apparatus according to clause (26), wherein the order enforcement circuitry is configured to detect whether the address information associated with the given non-delegable memory access corresponds to an address tracked in the delegable memory access tracking structure for the delegable memory access, based on detecting:
whether the delegable memory access tracking structure includes a conflicting entry for which the tracking information corresponds to the address information of the given non-delegable memory access; and whether the delegable instruction queue includes a valid entry, relating to an older instruction than the instruction associated with the given non-delegable memory access, for which said field specifies the identifier of said conflicting entry of the delegable memory access tracking structure.

(28). The apparatus according to any of clauses (23) to (27), wherein the tracking circuitry is configured to maintain a region table comprising a plurality of region table entries, each region table entry indicating a region mapping specifying a physical address region associated with a region table entry identifier identifying that region table entry; and the tracking circuitry is configured to synchronise region mappings specified in the region table with a corresponding region table in the external processing apparatus.

(29). The apparatus according to clause (28), wherein the offloading circuitry is configured to include, in the request to the external processing apparatus, a selected region table entry identifier indicating which region table entry corresponds to a physical address region comprising the target address of the delegable memory access, instead of including a full target address of the delegable memory access.

(30). The apparatus according to any of clauses (28) and (29), wherein the region table is configured to track region mappings for physical address regions accessed by delegable memory access instructions guaranteed to be committed.

(31). The apparatus according to clause (30), wherein the tracking circuitry is configured to defer synchronising a given region mapping with the corresponding region table in the external processing apparatus until after a delegable memory access instruction which accesses a target address in a given physical address region specified by the given region mapping is guaranteed to be committed.

(32). The apparatus according to any of clauses (30) and (31), wherein the delegable memory access tracking structure comprises a speculative region table, and the tracking circuitry is configured to allocate region mappings to the speculative region table for physical address regions accessed by delegable memory access instructions not yet guaranteed to be committed.

(33). The apparatus according to clause (32), wherein dependent on a delegable memory access instruction being guaranteed to be committed, the tracking circuitry is configured to update a region table entry of the region table corresponding to a target address of the delegable memory access instruction guaranteed to be committed, and to perform a region table entry identifier swap process to replace a speculative region table entry identifier associated with the delegable memory access instruction with a region table entry identifier associated with the delegable memory access instruction.

(34). The apparatus according to any of clauses (28) and (29), wherein the region table is configured to track region mappings for physical address regions accessed by still-to-be-committed delegable memory access instructions, and the tracking circuitry is capable of speculatively synchronising a given region mapping with the corresponding region table in the external processing apparatus before a delegable memory access instruction which accesses a target address in a given physical address region specified by the given region mapping is guaranteed to be committed.

(35) The apparatus according to any of clauses (28) to (34) wherein the tracking circuitry is configured to maintain the region table to store at least one counter indicative of a number of uncompleted delegable memory accesses to the physical address region which are guaranteed to be committed but not yet indicated as completed by the external processing apparatus.

(36). The apparatus of clause (35), wherein the tracking circuitry is configured to maintain the region table to store a plurality of sub-region counters each indicative of a number of said uncompleted delegable memory accesses to a corresponding sub-region of memory addresses within the physical address region.

(37). The apparatus of any of clauses (23), (24), (25), (28), (29), (34), (35) and (36), wherein the tracking information comprises a memory region identifier indicative of a region of memory addresses including the target address.

(38). The apparatus of clause (37), wherein the tracking circuitry is configured to maintain a region table to store at least a portion of a physical region address defining the region of memory addresses; and the memory region identifier comprises an index at which the portion of the physical region address is stored in the region table.

(39). The apparatus of any of clauses (23) to (38), wherein the offloading circuitry is configured to identify an instruction of at least one class of single-instruction-multiple-data memory access instruction as the delegable memory access instruction.

(40). The apparatus of clause (39), wherein the single-instruction-multiple-data instruction is a scalable vector/matrix instruction, wherein in response to the scalable vector/matrix instruction, the external processor is caused to perform a sequence of one or more operations on each element in a vector/matrix; and a size of the vector/matrix is defined by at least one parameter stored in a register.

(41). A system comprising:

the apparatus of any of clauses (23) to (40), implemented in at least one packaged chip;

at least one system component; and a board, wherein the at least one packaged chip and the at least one system component are assembled on the board.

(42). A chip-containing product comprising the system of clause (41), assembled on a further board with at least one other product component.

(43). A method comprising:

performing, with memory access circuitry, memory access instructions among a series of instructions to be executed;

identifying, in the series of memory access instructions, a delegable memory access instruction specifying a delegable memory access to be performed to a target address by an external processing apparatus instead of the delegable memory access being performed by the memory access circuitry and, dependent on the delegable memory access instruction being committed, sending a request to the external processing apparatus to request that the external processing apparatus performs the delegable memory access specified by the delegable memory access instruction;

maintaining tracking information representing the target address of the delegable memory access in a delegable memory access tracking structure separate from a tracking structure used to track non-delegable memory access to be performed by the memory access circuitry; and enforcing an ordering requirement between a given non-delegable memory access and the delegable memory access based on a lookup of address information associated with the given non-delegable memory access in the delegable memory access tracking structure.

(44). A non-transitory computer-readable medium to store computer-readable code for fabrication of an apparatus comprising:
  memory access circuitry configured to perform memory accesses in response to memory access instructions among a series of instructions to be executed;
  offloading circuitry configured to:
    identify, in the series of instructions, a delegable memory access instruction specifying a delegable memory access to be performed to a target address by an external processing apparatus instead of the delegable memory access being performed by the memory access circuitry; and
    dependent on the delegable memory access instruction being committed, to send a request to the external processing apparatus to request that the external processing apparatus performs the delegable memory access specified by the delegable memory access instruction;
  tracking circuitry to maintain tracking information representing the target address of the delegable memory access in a delegable memory access tracking structure separate from a tracking structure used to track non-delegable memory accesses to be performed by the memory access circuitry; and
  order enforcement circuitry configured to enforce an ordering requirement between a given non-delegable memory access and the delegable memory access based on a lookup of address information associated with the given non-delegable memory access in the delegable memory access tracking structure.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
  memory access circuitry configured to perform memory accesses in response to memory access instructions among a series of instructions to be executed;
  offloading circuitry configured to:
    identify, in the series of instructions, a delegable memory access instruction specifying a delegable memory access to be performed to a target address by an external processing apparatus instead of the delegable memory access being performed by the memory access circuitry; and
    dependent on the delegable memory access instruction being committed, to send a request to the external processing apparatus to request that the external processing apparatus performs the delegable memory access specified by the delegable memory access instruction;
  tracking circuitry configured to maintain tracking information representing the target address of the delegable memory access in a delegable memory access tracking structure separate from a tracking structure used to track non-delegable memory accesses to be performed by the memory access circuitry; and
  order enforcement circuitry configured to enforce an ordering requirement between a given non-delegable memory access and the delegable memory access based on a lookup of address information associated with the given non-delegable memory access in the delegable memory access tracking structure.

2. The apparatus according to claim 1, wherein the tracking circuitry is configured to allocate tracking information representing target addresses of one or more still-to-be-committed delegable memory accesses to the delegable memory access tracking structure.

3. The apparatus according to claim 1, wherein
  in absence of an intervening non-delegable store memory access between the delegable memory access and the given non-delegable memory access removing a need for hazarding between the delegable memory access and the given non-delegable memory access, the order enforcement circuitry is configured to detect an ordering hazard between the given non-delegable memory access and the delegable memory access in response to detecting at least that:
    the address information associated with the given non-delegable memory access corresponds to tracking information tracked in the delegable memory access tracking structure for the delegable memory access; and
    the given non-delegable memory access is associated with an instruction that is later in program order than the delegable memory access instruction.

4. The apparatus according to claim 3, comprising a delegable instruction queue to track delegable instructions awaiting processing by the external processing apparatus, wherein each entry in the delegable instruction queue has a field for specifying an identifier of an associated entry in the delegable memory access tracking structure.

5. The apparatus according to claim 4, wherein the order enforcement circuitry is configured to detect whether the address information associated with the given non-delegable memory access corresponds to an address tracked in the delegable memory access tracking structure for the delegable memory access, based on detecting:
    whether the delegable memory access tracking structure includes a conflicting entry for which the tracking information corresponds to the address information of the given non-delegable memory access; and
    whether the delegable instruction queue includes a valid entry, relating to an older instruction than the instruction associated with the given non-delegable memory access, for which said field specifies the identifier of said conflicting entry of the delegable memory access tracking structure.

6. The apparatus according to claim 1, wherein the tracking circuitry is configured to maintain a region table comprising a plurality of region table entries, each region table entry indicating a region mapping specifying a physical address region associated with a region table entry identifier identifying that region table entry; and the tracking circuitry is configured to synchronise region mappings specified in the region table with a corresponding region table in the external processing apparatus.

7. The apparatus according to claim 6, wherein the offloading circuitry is configured to include, in the request to the external processing apparatus, a selected region table entry identifier indicating which region table entry corresponds to a physical address region comprising the target address of the delegable memory access, instead of including a full target address of the delegable memory access.

8. The apparatus according to claim 6, wherein the region table is configured to track region mappings for physical address regions accessed by delegable memory access instructions guaranteed to be committed.

9. The apparatus according to claim 8, wherein the tracking circuitry is configured to defer synchronising a given region mapping with the corresponding region table in the external processing apparatus until after a delegable memory access instruction which accesses a target address in a given physical address region specified by the given region mapping is guaranteed to be committed.

10. The apparatus according to claim 8, wherein the delegable memory access tracking structure comprises a speculative region table, and the tracking circuitry is configured to allocate region mappings to the speculative region table for physical address regions accessed by delegable memory access instructions not yet guaranteed to be committed.

11. The apparatus according to claim 10, wherein dependent on a delegable memory access instruction being guaranteed to be committed, the tracking circuitry is configured to update a region table entry of the region table corresponding to a target address of the delegable memory access instruction guaranteed to be committed, and to perform a region table entry identifier swap process to replace a speculative region table entry identifier associated with the delegable memory access instruction with a region table entry identifier associated with the delegable memory access instruction.

12. The apparatus according to claim 6, wherein the region table is configured to track region mappings for physical address regions accessed by still-to-be-committed delegable memory access instructions, and the tracking circuitry is capable of speculatively synchronising a given region mapping with the corresponding region table in the external processing apparatus before a delegable memory access instruction which accesses a target address in a given physical address region specified by the given region mapping is guaranteed to be committed.

13. The apparatus of claim 1, wherein
the tracking information comprises a memory region identifier indicative of a region of memory addresses including the target address.

14. The apparatus of claim 13, wherein
the tracking circuitry is configured to maintain a region table to store at least a portion of a physical region address defining the region of memory addresses; and
the memory region identifier comprises an index at which the portion of the physical region address is stored in the region table.

15. The apparatus of claim 1, wherein the offloading circuitry is configured to identify an instruction of at least one class of single-instruction-multiple-data memory access instruction as the delegable memory access instruction.

16. The apparatus of claim 15, wherein
the single-instruction-multiple-data instruction is a scalable vector/matrix instruction, wherein
in response to the scalable vector/matrix instruction, the external processing apparatus is caused to perform a sequence of one or more operations on each element in a vector/matrix; and
a size of the vector/matrix is defined by at least one parameter stored in a register.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17, assembled on a further board with at least one other product component.

19. A method comprising:
performing, with memory access circuitry, memory access instructions among a series of instructions to be executed;
identifying, in the series of instructions, a delegable memory access instruction specifying a delegable memory access to be performed to a target address by an external processing apparatus instead of the delegable memory access being performed by the memory access circuitry and, dependent on the delegable memory access instruction being committed, sending a request to the external processing apparatus to request that the external processing apparatus performs the delegable memory access specified by the delegable memory access instruction;
maintaining tracking information representing the target address of the delegable memory access in a delegable memory access tracking structure separate from a tracking structure used to track non-delegable memory access to be performed by the memory access circuitry; and
enforcing an ordering requirement between a given non-delegable memory access and the delegable memory access based on a lookup of address information associated with the given non-delegable memory access in the delegable memory access tracking structure.

20. A non-transitory computer-readable medium to store computer-readable code for fabrication of an apparatus comprising:
memory access circuitry configured to perform memory accesses in response to memory access instructions among a series of instructions to be executed;
offloading circuitry configured to:
identify, in the series of instructions, a delegable memory access instruction specifying a delegable memory access to be performed to a target address by an external processing apparatus instead of the delegable memory access being performed by the memory access circuitry; and
dependent on the delegable memory access instruction being committed, to send a request to the external processing apparatus to request that the external processing apparatus performs the delegable memory access specified by the delegable memory access instruction;
tracking circuitry configured to maintain tracking information representing the target address of the delegable memory access in a delegable memory access tracking structure separate from a tracking structure used to track non-delegable memory accesses to be performed by the memory access circuitry; and order enforcement circuitry configured to enforce an ordering requirement between a given non-delegable memory access and the delegable memory access based on a lookup of address information associated with the given non-delegable memory access in the delegable memory access tracking structure.

* * * * *